US010880291B2

(12) United States Patent
Livanos et al.

(10) Patent No.: US 10,880,291 B2
(45) Date of Patent: Dec. 29, 2020

(54) MOBILE IDENTITY FOR SINGLE SIGN-ON (SSO) IN ENTERPRISE NETWORKS

(71) Applicant: Cisco Technology, Inc., San Jose, CA (US)

(72) Inventors: Konstantin Livanos, Naperville, IL (US); Bart Brinckman, Nevele (BE); Ian McDowell Campbell, Littleton, CO (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 15/893,455

(22) Filed: Feb. 9, 2018

(65) Prior Publication Data

US 2019/0253407 A1     Aug. 15, 2019

(51) Int. Cl.
*H04L 29/06* (2006.01)
*H04W 12/06* (2009.01)
*H04W 12/10* (2009.01)
*H04W 12/04* (2009.01)

(52) U.S. Cl.
CPC ...... *H04L 63/0815* (2013.01); *H04L 63/0892* (2013.01); *H04L 63/102* (2013.01); *H04W 12/04* (2013.01); *H04W 12/0403* (2019.01); *H04W 12/06* (2013.01); *H04W 12/10* (2013.01)

(58) Field of Classification Search
CPC . H04W 12/06; H04W 12/04; H04W 12/0608; H04W 12/08; H04W 12/0602; H04W 12/0401; H04W 12/04031; H04W 12/00403; H04W 12/0403; H04W 12/04033; H04W 12/04071; H04W 8/02; H04W 8/04; H04W 8/18; H04L 63/0892; (Continued)

(56) References Cited

U.S. PATENT DOCUMENTS

| 8,533,803 | B2 | 9/2013 | Cha et al. | |
| 8,769,651 | B2 * | 7/2014 | Grajek | H04L 63/083 726/8 |
| 8,943,321 | B2 | 1/2015 | Holtmanns et al. | |

(Continued)

FOREIGN PATENT DOCUMENTS

WO     2011/162481 A2     12/2011

OTHER PUBLICATIONS

3GPP Organizational Partners, "3rd Generation Partnership Project; Technical Specification Group Services and System Aspects; Generic Authentication Architecture (GAA); Generic Bootstrapping Architecture (GBA) (Release 15)", 3GPP TS 33.220 V15.1.0, Jan. 2018, 4 pages.

(Continued)

*Primary Examiner* — Tae K Kim

(57) ABSTRACT

Single sign-on (SSO) techniques of the present disclosure provide for enterprise application user identities that are bound to a mobile identity (e.g. IMSI) associated with a user equipment (UE) for authentication, using general bootstrapping architecture (GBA)/general authentication architecture (GAA) functionality in combination with identity provider (IDP) functionality (e.g. OpenID Connect), all of which may be provided in an enterprise network. The present techniques need not rely on GBA/GAA infrastructure of a mobile network operator (MNO), and have little or no impact or effect on the mobile network.

20 Claims, 13 Drawing Sheets

(58) Field of Classification Search
CPC . H04L 63/0853; H04L 63/08; H04L 63/0884; H04L 61/203
See application file for complete search history.

(56) References Cited

U.S. PATENT DOCUMENTS

| | | | |
|---|---|---|---|
| 9,152,781 B2 | 10/2015 | Sowatskey | |
| 9,369,457 B2* | 6/2016 | Grajek | H04W 12/0609 |
| 9,392,459 B2 | 7/2016 | Starsinic et al. | |
| 9,614,831 B2 | 4/2017 | Shah et al. | |
| 9,654,966 B2 | 5/2017 | Samela et al. | |
| 9,716,996 B2* | 7/2017 | Kant | H04W 12/0027 |
| 10,021,560 B2* | 7/2018 | Kant | H04W 12/0027 |
| 10,200,357 B2* | 2/2019 | Grajek | H04W 12/0608 |
| 2018/0206117 A1* | 7/2018 | Stahl | H04W 12/04031 |
| 2019/0036896 A1 | 1/2019 | Khushu et al. | |
| 2019/0200283 A1* | 6/2019 | Graybeal | H04W 12/003 |
| 2020/0068397 A1* | 2/2020 | Kang | H04L 63/0823 |

OTHER PUBLICATIONS

3GPP Organizational Partners, "3rd Generation Partnership Project; Technical Specification Group Services and System Aspects; Liberty Alliance and 3GPP security interworking; Interworking of Liberty Alliance Identity Federation Framework (ID-FF), Identity Web Services Framework (ID-WSF) and Generic Authentication Architecture (GAA) (Release 14)", 3GPP TR 33.980 V14.0.0, Mar. 2017, 40 pages.

3GPP Organizational Partners, "3rd Generation Partnership Project; Technical Specification Group Core Network and Terminals; Evolved Packet System (EPS); 3GPP EPS AAA interfaces (Release 15)", 3GPP TS 29.273 V15.1.0, Dec. 2017, 199 pages.

3GPP Organizational Partners, "3rd Generation Partnership Project; Technical Specification Group Services and System Aspects; System Architecture for the 5G System; Stage 2 (Release 15)", 3GPP TS 23.501 V15.0.0, Dec. 2017, 181 pages.

3GPP Organizational Partners, "3rd Generation Partnership Project; Technical Specification Group Services and System Aspects; 3GPP System Architecture Evolution (SAE); Security aspects of non-3GPP accesses (Release 14)", 3GPP TS 33.402 V143.0, Sep. 2017, 72 pages.

International Search Report and Written Opinion in corresponding International Application No. PCT/US2019/016298, dated Apr. 17, 2019, 12 pages.

Technical Specification, "3rd Generation Partnership Project; Technical Specification Group Services and System Aspects; Generic Authentication Architecture (GAA); Generic Bootstrapping Architecture (GBA) (Release 15)", 3GPP TS 33.220, V15.1.0, Jan. 2018, 93 pages.

* cited by examiner

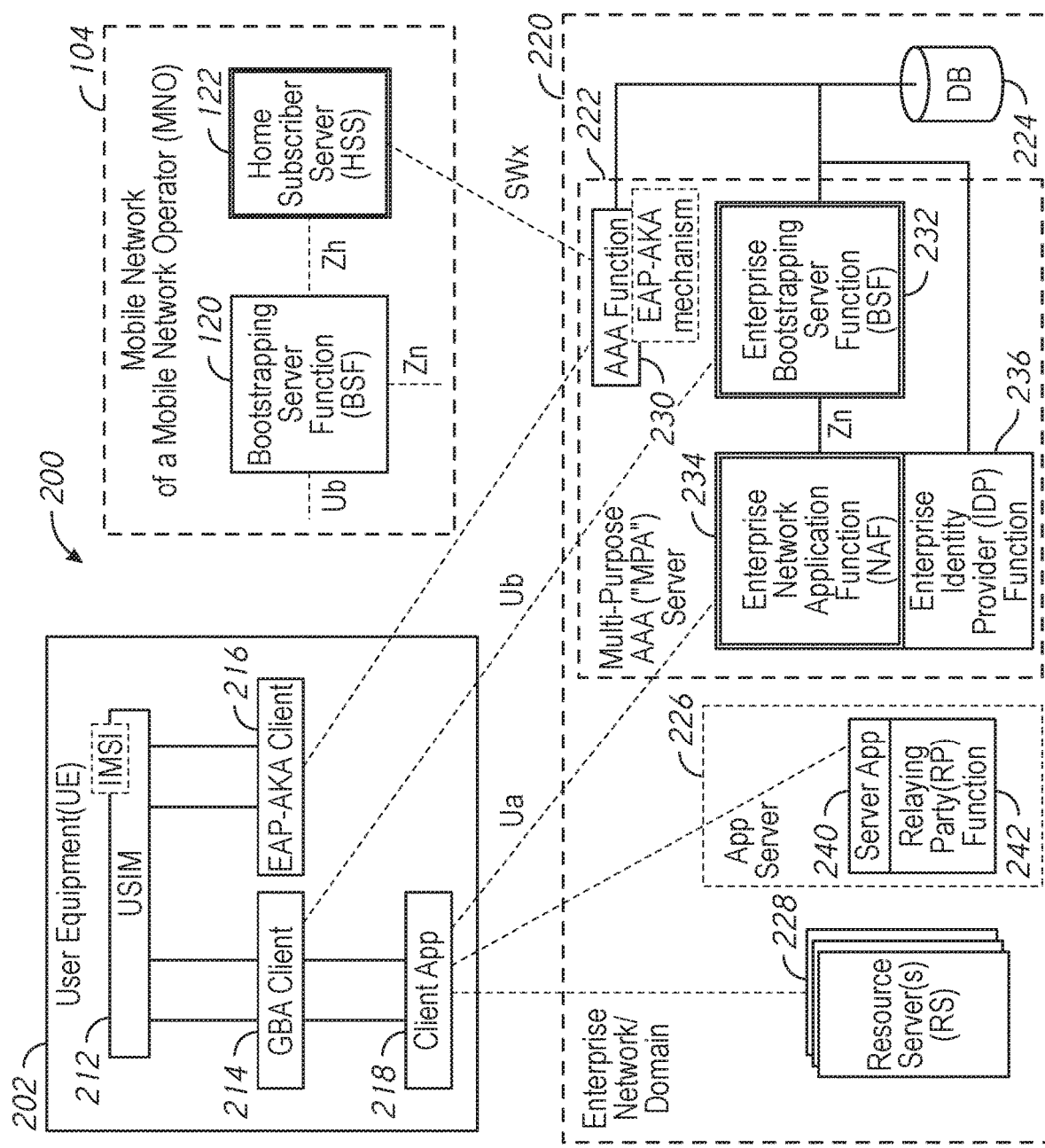

(See FIG. 4A)

(See FIG. 4B)

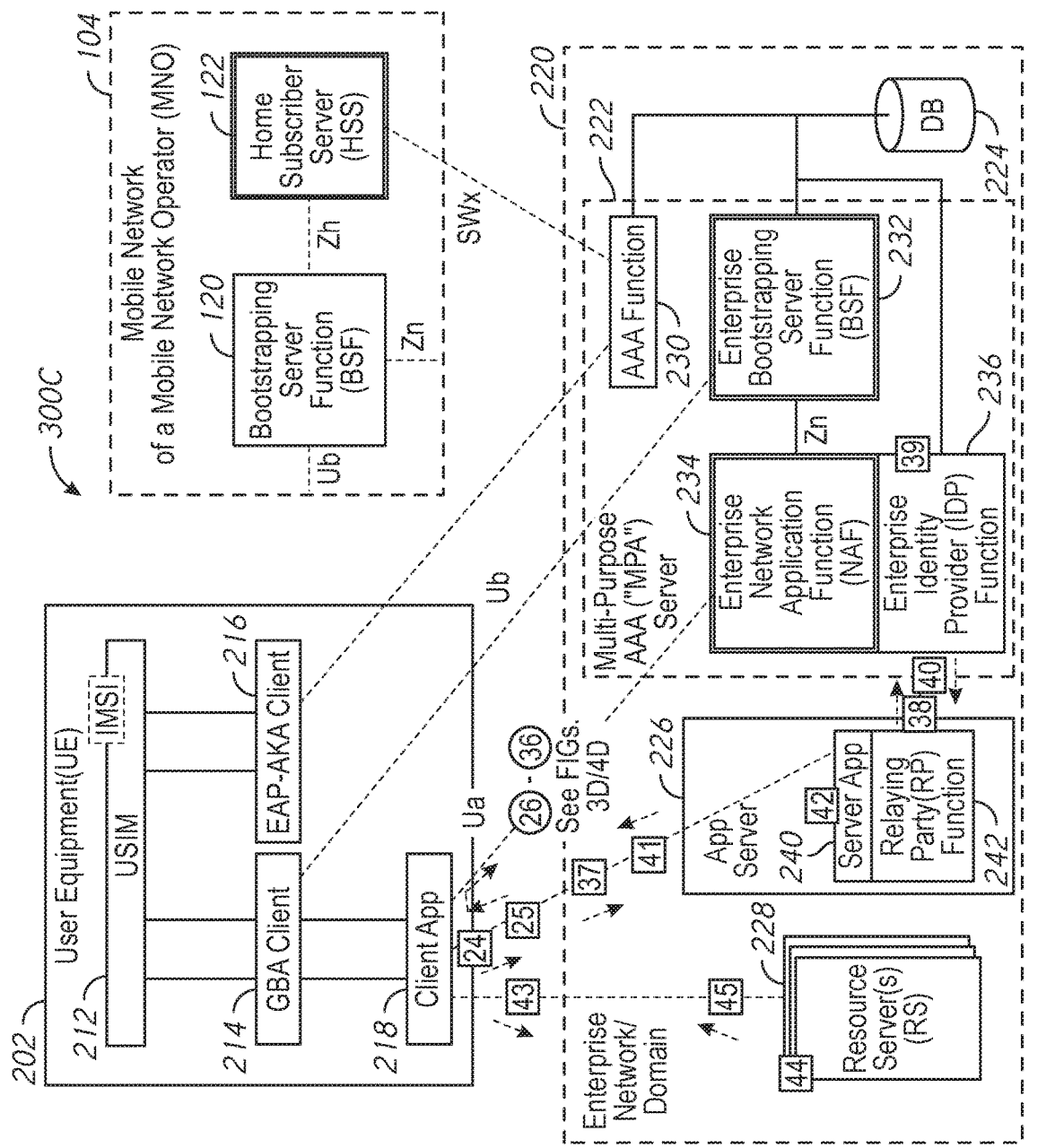
FIG. 3C (See FIG. 4C)

(See FIG. 4D)

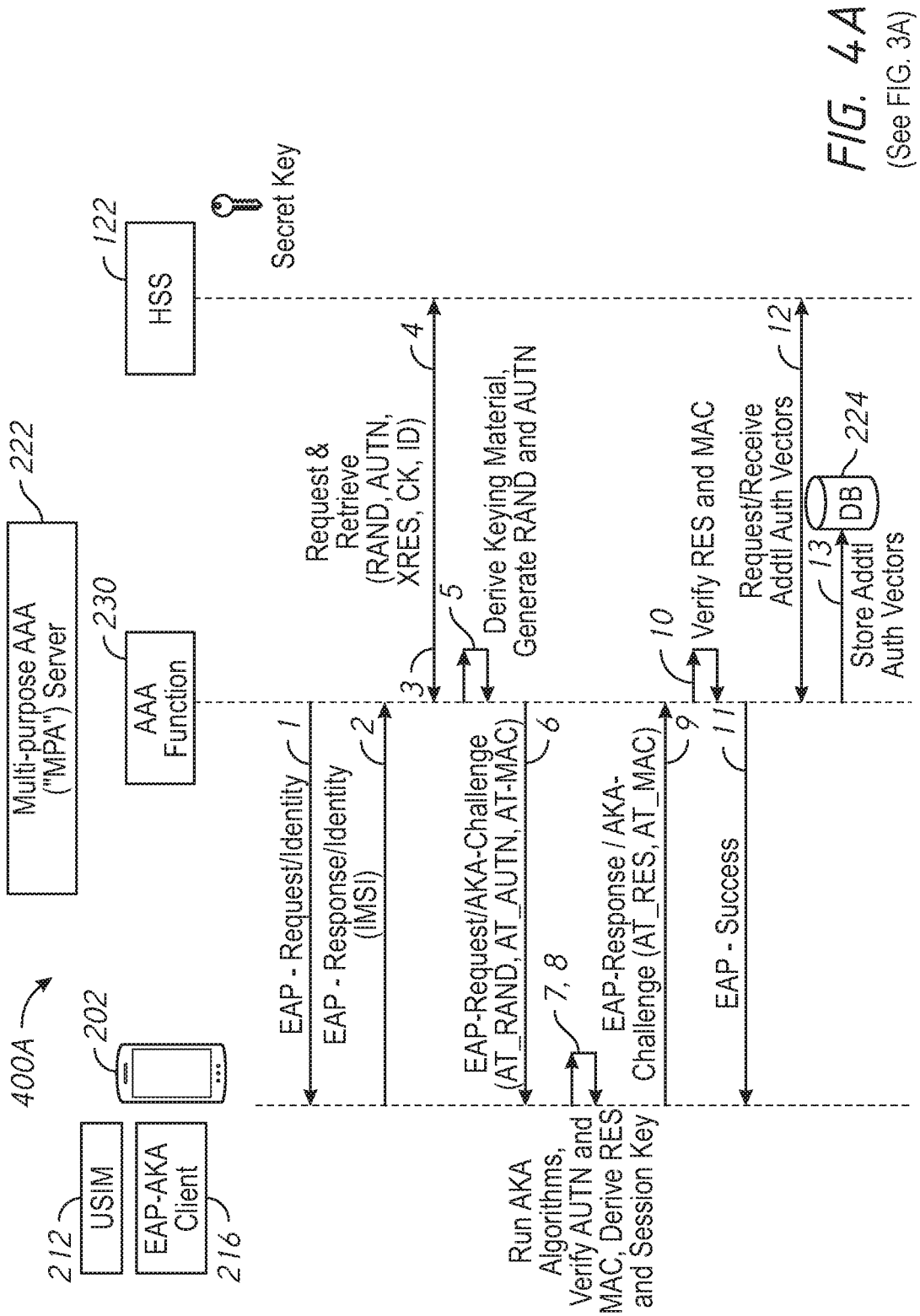

(See FIG. 3B)

(See FIG. 3C)

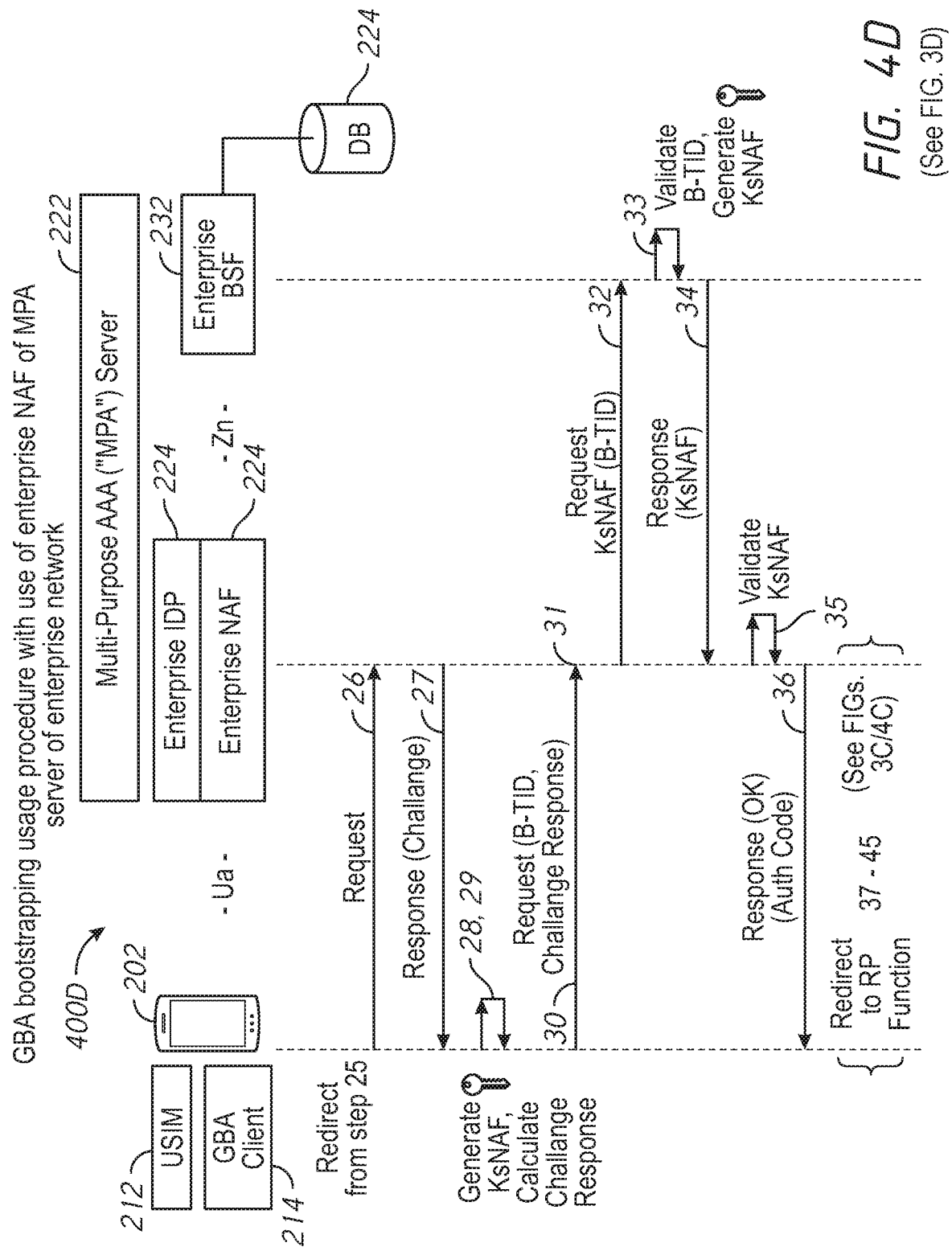

MOBILE IDENTITY FOR SINGLE SIGN-ON (SSO) IN ENTERPRISE NETWORKS

TECHNICAL FIELD

The present disclosure relates to authentication of user equipment across multiple networks, an in particular single sign-on (SSO) authentication.

BACKGROUND

There is a need for providing authentication of user equipment (UE) in a mobile network along with secure communications for the UE, with further authentication and secure communications for various applications and services in an enterprise network after the UE is authenticated in the mobile network, preferably with a single sign-on (SSO) technique with its associated advantages. It would be desirable that one or more user identities associated with the various applications be bound to the mobile identity (e.g. IMSI or IMPI) of the UE. It would be further desirable that little or no changes be made in the mobile network to achieve the same, with little or no reliance on General Bootstrapping Architecture (GBA)/General Authentication Architecture (GAA) elements in the mobile network. Put another way, it is desirable to provide a solution that has little or no impact or effect on the mobile network (e.g., the solution should be transparent to the mobile network).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A is an illustrative representation of a network architecture for authentication of a UE using a multi-purpose authorization, authentication, and accounting (AAA) ("MPA") server of the enterprise network;

FIG. 3C is the network architecture of FIG. 2A indicating a third process flow for continuing the description of the technique for authenticating and securing communications for the UE using the MPA server of the enterprise network, more particularly indicating steps for performing an identity verification of the UE with use of an identity provider (IDP) function of the MPA server of the enterprise network;

FIG. 4A is a first process flow diagram corresponding to the first process flow of FIG. 3A, particularly relating to the steps for performing authentication of the UE in the mobile network with use of the EAP-AKA mechanism;

FIG. 4D is a fourth process flow diagram corresponding to the first process flow of FIG. 3D, particularly relating to the steps for performing a bootstrapping usage procedure between the UE and the enterprise NAF of the MPA server of the enterprise network;

Figure 1:
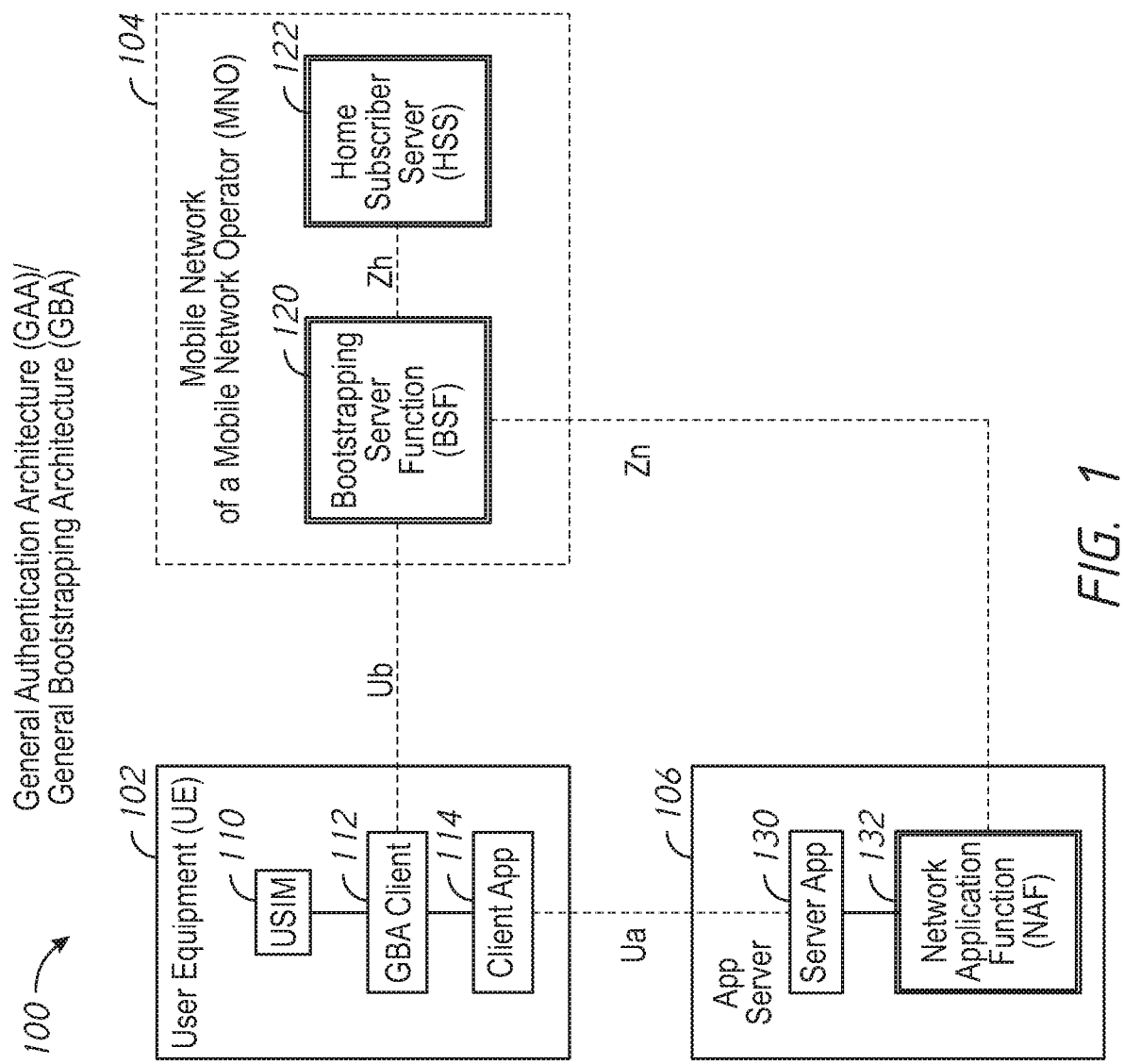
FIG. 1 is an illustrative representation of a network architecture for authenticating and securing communications for user equipment (UE) in a mobile network using General Authentication Architecture (GAA)/General Bootstrapping Architecture (GBA)

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Single sign-on (SSO) techniques of the present disclosure provide for enterprise application user identities that are bound to a mobile identity (e.g. an IMSI or IMPI) of a user equipment (UE) for authentication, using general bootstrapping architecture (GBA)/general authentication architecture (GAA) functionality in combination with identity provider (IDP) functionality (e.g. OpenID Connect) in an enterprise network environment.

Advantageously, the techniques of the present disclosure need not rely on the GBA/GAA infrastructure of the mobile network operator (MNO). That is, the newly-provided GBA/GAA-based UE application layer authentication of the present disclosure is preferably transparent to the mobile network.

In some implementations of the present techniques, an authorization server (e.g. a multi-purpose AAA server) may be provided in an enterprise network for authentication of the UE having a mobile identity (e.g. an IMSI). The authorization server may include a mobile network authentication function (e.g. an EAP-AKA mechanism), an enterprise bootstrapping server function (BSF), and an enterprise identity provider (IDP) function which utilizes an enterprise network application function (NAF) for authentication.

As one illustrative example, the authorization server may perform, using the mobile network authentication function, an authentication procedure with the UE for authenticating the UE in the mobile network based on an authentication vector retrieved from a subscription database (e.g. HSS) of the mobile network based on the mobile identity. The authorization server may further perform, using the enterprise BSF, a GBA bootstrapping procedure with the UE for authenticating the UE based on an additional authentication vector retrieved from the subscription database based on the mobile identity, where a bootstrapping session key (Ks) associated with a bootstrapping transaction identifier (B-TID) is obtained. Upon UE request to access an application of an application server (AS or web server "WS") which utilizes a relying party (RP) function, the UE request is redirected to the enterprise IDP function for authentication of the UE, which is performed by the enterprise NAF using the B-TID as a temporary identity. In response to a successful authentication, the UE is provided with an authorization code to send to the RP function, which provides it to the IDP function for verification. In response to a successful verification, the UE may obtain an identity token and an access token from the RP function. The access token may be used by the UE for authentication/access to one or more resource servers (RS) of the enterprise network.

As another illustrative example, a UE may be configured to perform, via an enterprise network, an Extensible Authentication Protocol (EAP)-Authentication and Key Agreement (AKA) procedure for authentication in a mobile network based on an authentication vector obtained from the mobile network based on a mobile identity of the UE; perform a GBA bootstrapping procedure with the enterprise network for obtaining a Ks and a B-TID associated with the Ks, based on an additional authentication vector obtained from the mobile network based on the mobile identity; request access to an application of an application server of the enterprise network with a user identity; and perform a GBA bootstrapping usage procedure with the enterprise network for authentication based on the B-TID for accessing the application of the application server. The mobile identity may comprise an International Mobile Subscriber Identity (IMSI) (or e.g. an IMPI), where the UE may be further operative with use of a Universal Subscriber Identity Module (USIM) for use in the EAP-AKA procedure and the GBA bootstrapping procedure. A binding between the user identity and the mobile identity may be verified in the enterprise network for the authentication to access the application of the application server. The UE may be further configured to receive from the enterprise network an authentication code as a result of the GPA bootstrapping usage procedure; provide to the enterprise network the authentication code to receive an access token; and request and receive access to a resource server of the enterprise network based on the authentication code.

Example Embodiments

FIG. 1 is an illustrative representation of a network architecture 100 for authenticating and securing communications for user equipment (UE) 102 in a mobile network 104 of a mobile network operator (MNO) with use of General Bootstrapping Architecture (GBA)/General Authentication Architecture (GAA).

Network architecture 100 which includes the GBA includes a plurality of network elements defined in 3GPP TS 32.220. The plurality of network elements includes a Bootstrapping Server Function (BSF) 120, a Home Subscriber Server (HSS) 122, and a Network Application Function (NAF) 132. The interfaces defined in 3GPP TS 32.220 include a Ua interface between UE 102 and NAF 132, a Ub interface between UE 102 and BSF 120, a Zn Interface between NAF 132 and BSF 120, and a Zh interface between BSF 120 and HSS 122.

As shown in FIG. 1, BSF 120 and HSS 122 are provided in mobile network 104 of the MNO. NAF 132 is provided on an application server 106 having a server application 130. UE 102 includes a client application 114 for communication with the server application 130 of application server 106. For authentication and secure communication, a GBA client 112 of UE 102 uses subscription credentials in a Subscriber Identity Module (SIM) or Universal SIM (USIM) 110.

Note that there is a need for providing authentication of user equipment (UE) in a mobile network along with secure communications, with further authentication and secure communications for various applications and services in an enterprise network (e.g. based on GBA/GAA) after the UE is authenticated in the mobile network, preferably with a single sign-on (SSO) technique with its associated advantages. It would be desirable that one or more user identities associated with the various applications be bound to the mobile identity (e.g. IMSI or IMPI) of the UE. It would be further desirable that little or no changes be made in the mobile network to achieve the same, with little or no reliance on the GBA/GAA architecture of the mobile network. Put another way, it is desirable to provide a solution that has little or no impact or effect on the mobile network (e.g., the solution should be transparent to the mobile network).

FIG. 2A is an illustrative representation of a network architecture 200 for use in authenticating and providing secure communications for a UE 202, with use of a multi-purpose AAA ("MPA") server 222 of an enterprise network 220. Enterprise network 220 may be different from, outside and/or not a part of mobile network 104 (e.g. enterprise network 220 may be that of a business organization, such as a company or corporation). The MPA server 222 of enterprise network 220 may be more generally referred to as an authentication server or an enterprise authentication server. MPA server 222 includes an AAA function 230, an enterprise BSF 232, and an enterprise NAF 234.

AAA function 230 is an authentication function which includes an Extensible Authentication Protocol (EAP)-Authentication and Key Agreement (AKA) mechanism for use in authenticating UE 202 in mobile network 104. The base mechanism/protocol is described in 3GPP TS 33.402 (Security Architecture for non-3GPP accesses). See also e.g. Request for Comments (RFC) 4187 (Extensible Authentication Protocol Methods for 3$^{rd}$ Generation Authentication and Key Agreement (EAP-AKA).

Enterprise network 220 has GBA network elements which include enterprise BSF 232 and enterprise NAF 234 of MPA server 222. GBA technology provides a means to implement AKA with the GBA generating time-limited session keys. The generated keys may be used for creating, for example, Transport Layer Security (TLS) based protected communication channels for communication.

Enterprise BSF 232 and enterprise NAF 234 of MPA server 222 may have the same or similar general configuration and operation as the network elements defined in 3GPP TS 32.220 (GBA/GAA), except where adapted, modified, and/or added to accommodate the techniques of the present disclosure. The interfaces of this architecture include a Ua interface between UE 202 and enterprise NAF 234, a Ub interface between UE 202 and enterprise BSF 232, and a Zn Interface between enterprise NAF 234 and enterprise BSF 232. According to some implementations of the present disclosure, as GBA and other elements/functions of enterprise network 220 may be employed, GBA network elements of mobile network 104 are not necessary for authentication and secure communication for UE 202.

UE 202 may include one or more processors and one or more wireless transceivers coupled to the one or more processors, configured to operate to perform the functionality described herein. UE 202 may also include a Universal Integrated Circuit Card (UICC) having a USIM 212. USIM 212 may store a mobile identity (e.g. an International Mobile Subscriber Identity or IMSI) and authentication information (e.g. subscription credentials). For authentication purposes, the USIM may store a long-term, pre-shared secret key K (e.g. shared with an Authentication Center (AuC) in the mobile network). USIM 212 is operative to compute RES, CK, and IK values using the secret key K for authentication purposes.

For authentication in mobile network 104, UE 202 may include an EAP-AKA client 216 operative with AAA function 230 of MPA server 222. EAP-AKA client 216 may be configured for processing in accordance with 3GPP TS 33.402 (Security Architecture for non-3GPP accesses).

UE 202 may also include a client application 218 for communication with a server application 240 of an application server 226 (e.g. a web server or WS) in enterprise network 220. Examples of application services may be or include data traffic services, and IP multimedia services such as Mobile TV, streaming media, and VoLTE, etc. UE 202 may be further provided with access to one or more resource servers (RSs) (e.g. one or more directories, or payroll database, etc.).

For authentication and secure communication using client application 218, UE 202 may include a GBA client 214 for use with the GBA network elements in enterprise network 220, namely, enterprise BSF 232 and enterprise NAF 234. GBA client 214 may be configured to generally operate in accordance with the 3GPP TS 33.220x series of specifications.

MPA server 222 having enterprise NAF 234 may be further provided with an enterprise identity provider (IDP) function 236. Enterprise NAF 234 and enterprise IDP function 236 may be or be viewed as a single entity with distinct endpoints. Relatedly, application server 226 (or "WS") having server application 240 is further provided with a relying party (RP) function 242. Notably, enterprise IDP function 236 and RP function 242 may be configured to provide identity verification, authorization, and/or authentication. In some implementations of the present disclosure, enterprise IDP function 236 and RP function 242 may be configured for processing in accordance with OpenID Connect (e.g. in accordance with one or more OpenID Connect specifications, such as or including OpenID Connect Core). Here, enterprise IDP function 236 may be and/or be referred to as an enterprise OpenID Connect Provider (OP) function (e.g., an enterprise OP function).

In general, OpenID Connect is a simple identity layer on top of an OAuth protocol (e.g. OAuth 2.0 protocol). It allows applications to verify the identity of the end user based on the authentication performed by an authorization server, as well as to obtain basic profile information about the end user in an interoperable and REST-like manner. OpenID Connect procedures may produce and make use of an identity (ID) token and/or an access token, where items such as the ID token may be or include the user identity encoded in a secure JavaScript Object Notation (JSON) Web Token (JWT).

At least AAA function 230 and enterprise BSF 232 of MPA server 222 may store and retrieve data from a database (DB) 224 (which may be referred to as an MPA DB), which includes user identities of enterprise/server applications bound to mobile identity (e.g. IMSI or IMPI) for UEs, as well as one or more additional sets of authentication vectors (e.g. RAND and AUTN) retrieved from HSS 122 for UEs. The user identities of the enterprise/server applications for a given UE may be provisioned in DB 224 prior to use of the UE. More details regarding such operation and use will be provided in relation to the remaining figures.

Figure 2B:
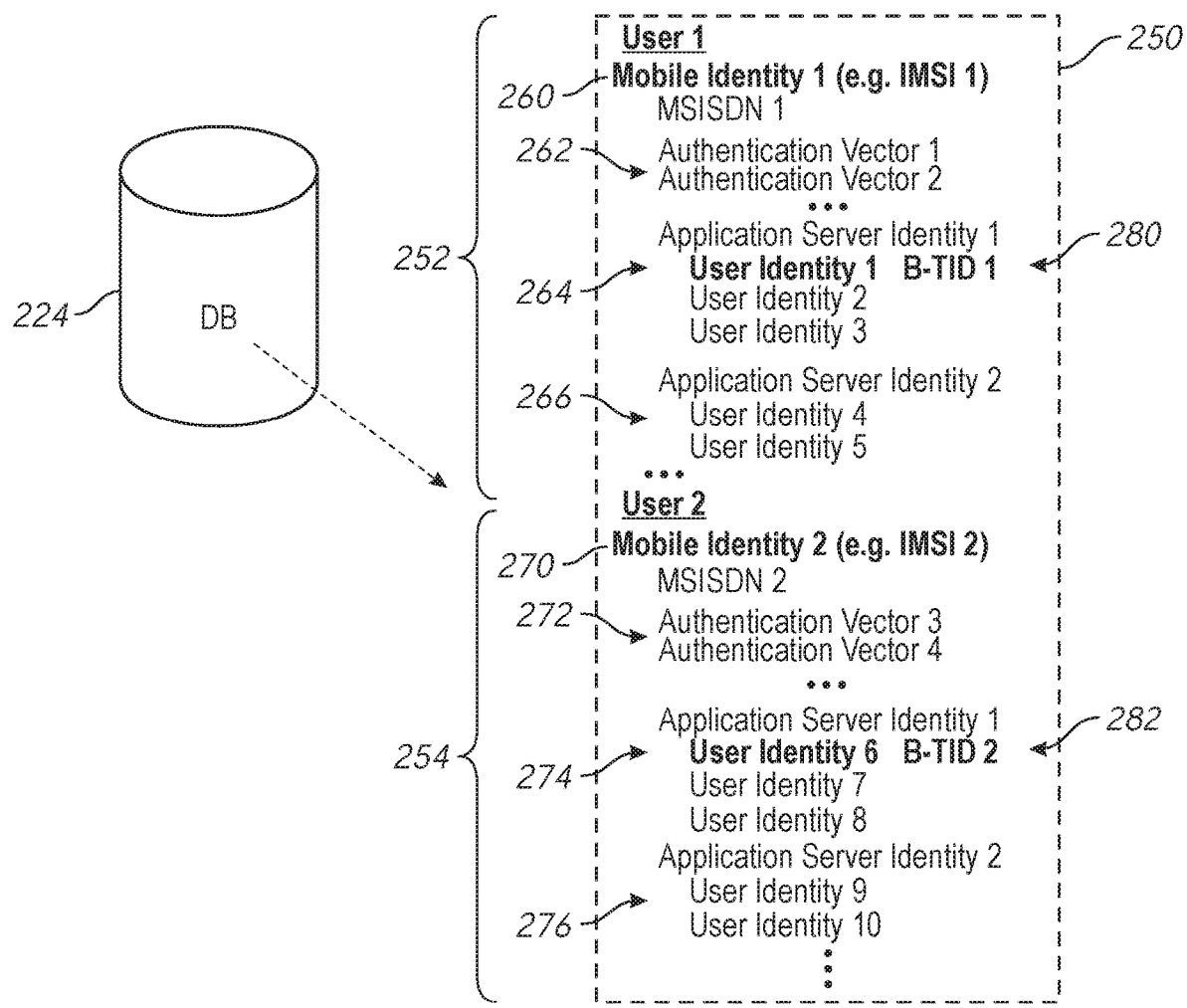
FIG. 2B is an illustrative representation of data items which may be stored in a database (DB) of the MPA server of FIG. 2A, where the DB includes mobile identities (e.g. IMSIs) which are bound to user identities of applications in the enterprise network.

FIG. 2B is an illustrative representation of data items 250 which may be stored in DB 224 of the MPA server 222 of FIG. 2A. DB 224 may store data items for each one of a plurality of subscribers or users of the enterprise network. In the example of FIG. 2B, DB 224 may store data items 252 for user 1 and data items 254 for user 2. Each user is associated with a UE having a USIM which includes a mobile identity, such as an IMSI (see e.g. UE 202 of FIG. 2A). In the example of FIG. 2B, DB 224 may store a mobile identity 1 (or e.g. IMSI 1) 260 for user 1 and a mobile identity 2 (or e.g. IMSI 2) 270 for user 2. Each mobile identity may further be associated with a mobile telephone number, such as a mobile station international subscriber identification number (MSISDN) as indicated.

The data items associated with each user may further include one or more additional authentication vectors for use in authentication in the enterprise network described later below. In the example of FIG. 2B, DB 224 may store a set 262 of additional authentication vectors 1 and 2 for user 1 and a set 272 of additional authentication vectors 3 and 4 for user 2. The additional authentication vectors may be obtained and stored for subsequent retrieval and use as described below in relation to FIGS. 3A and 4A (e.g., obtaining and storing the additional vectors in step 12) and FIGS. 3B and 4B (e.g., subsequently retrieving and using an additional authentication vector in steps 15-18)

The data items associated with each user may further include one or more sets of user identities, where each set may be associated with an application server identity corresponding to an application server (e.g. application server 226 of FIG. 2A). A user identity may be for use in the identification, verification, and/or authentication of the user with respect to use of one or more applications of one or more application servers identified by the associated application server identity. According to the present disclosure, a user identity may be bound to the mobile identity (e.g. the IMSI) of a given UE.

In the example of FIG. 2B, for user 1, DB 224 may store a set 264 of one or more user identities associated with an application server identity 1, where the user identities include a user identity 1 which is associated with an application 1, a user identity 2 which may be associated with an application 2, and a user identity 3 which may be associated with an application 3. Further for user 1, DB 224 may store a set 266 of one or more user identities associated with an application server identity 2, where the user identities include a user identity 4 which may be associated with an application 4 and a user identity 5 which may be associated with an application 5.

Further in the example of FIG. 2B, for user 2, DB 224 may store a set 274 of one or more user identities associated with the application server identity 1, where the user identities include a user identity 6 which is associated with the application 1, a user identity 7 which may be associated with the application 2, and a user identity 8 which may be associated with the application 3. Further for user 2, DB 224 may store a set 276 of one or more user identities associated with the application server identity 2, where the user identities include a user identity 9 which is associated with an application 4 and a user identity 10 which may be associated with an application 5.

Note that the user identities and associated application server identities which are stored in association with (e.g. and/or bound to) each mobile identity as described in relation to FIG. 2B may be provisioned in the DB 224 (as well as in the UEs) prior to use (e.g. preconfigured or through a registration procedure), and will depend upon the applications and services offered in the enterprise network 220. Further, the application server identities may be used as the "client IDs" in relation to the identity provider functionality (e.g., in the OpenID Connect protocol; see e.g. step 25 of FIGS. 4C and 5C); clients (e.g. RP function 242) may register with IDP function 236 where a client ID associated with the client is generated and stored.

It is further shown in FIG. 2B that a bootstrapping transaction identifier (B-TID) may be stored in association with each user, mobile identity, application server identity, and/or user identity. In the present disclosure, the B-TID which is bound to the mobile identity (e.g. IMSI), "bootstrapped" to the UE, may be used as a temporary identifier for UE application layer authentication described later below in relation to the figures. In the example of FIG. 2B, DB 224 may store a B-TID 280 ("B-TID 1") in association with user 1/mobile identity 1 (or more particularly, the user identity 1 for user 1), and may store a B-TID 282 ("B-TID 2") in association with user 2/mobile identity 2 (or more particularly, the user identity 6 for user 2).

More detailed operation of the entities of FIGS. 2A-2B will now be described in relation to the remaining figures. In at least some implementations of the present disclosure, operation of the entities and related messaging and data items may conform to the applicable standard specifications and documentation, except where adapted, modified, and/or added to accommodate the techniques of the present disclosure.

As will become apparent from the description, the techniques of the present disclosure for authenticating and securing communications may involve an SSO procedure, where no manual sign-on (e.g. no manual entry of user name and password) is required by the user. The techniques of the present disclosure need not rely (e.g. at all) on the MNO's GBA/GAA infrastructure in the mobile network. Put another way, the newly-provided GBA/GAA-based UE application layer authentication of the present disclosure may be transparent to the mobile network.

In the techniques of the present disclosure, all (of a plurality of) identities of a subscriber having a UE may be tied/bound to the mobile identity the UE. Consider the following example for illustration:

IMSI=310150123456789
MCC=310=USA
MNC=150=AT&T Mobility
MSIN=123456789

A first application server supported by AT&T may be an access network selection and discovery (ANDSF) server. A second application server supported by AT&T may be an X-CAP server for managing telephony supplementary services. The identity used to access the ANDSF server over the S14 interface (e.g., UE-ANDSF server) may be the MSISDN such as 630-555-5555. The identity used to access the XCAP server over the Ut interface (e.g., the UE-XCAP server) may be trlivanos1@xcap1.net. Here in this example, the IMSI may be considered the mobile identity, and the subscriber identities (or user identities) may be considered to be 630-555-5555 for the ANDSF server and trlivanos1@xcap1.net for the XCAP server.

FIGS. 3A, 3B, 3C, and 3D illustrate the network architecture 200 of FIG. 2A with indications of a process flow for a technique for authenticating and securing communications for a UE 202 using the MPA server 222 of the enterprise network 220. Relatedly, FIGS. 4A, 4B, 4C, and 4D are process flow diagrams 400A, 400B, 400C, and 400D corresponding to the process flows indicated in FIGS. 3A, 3B, 3C, and 3D, respectively, and will be discussed below in combination with those figures.

Figure 3A:
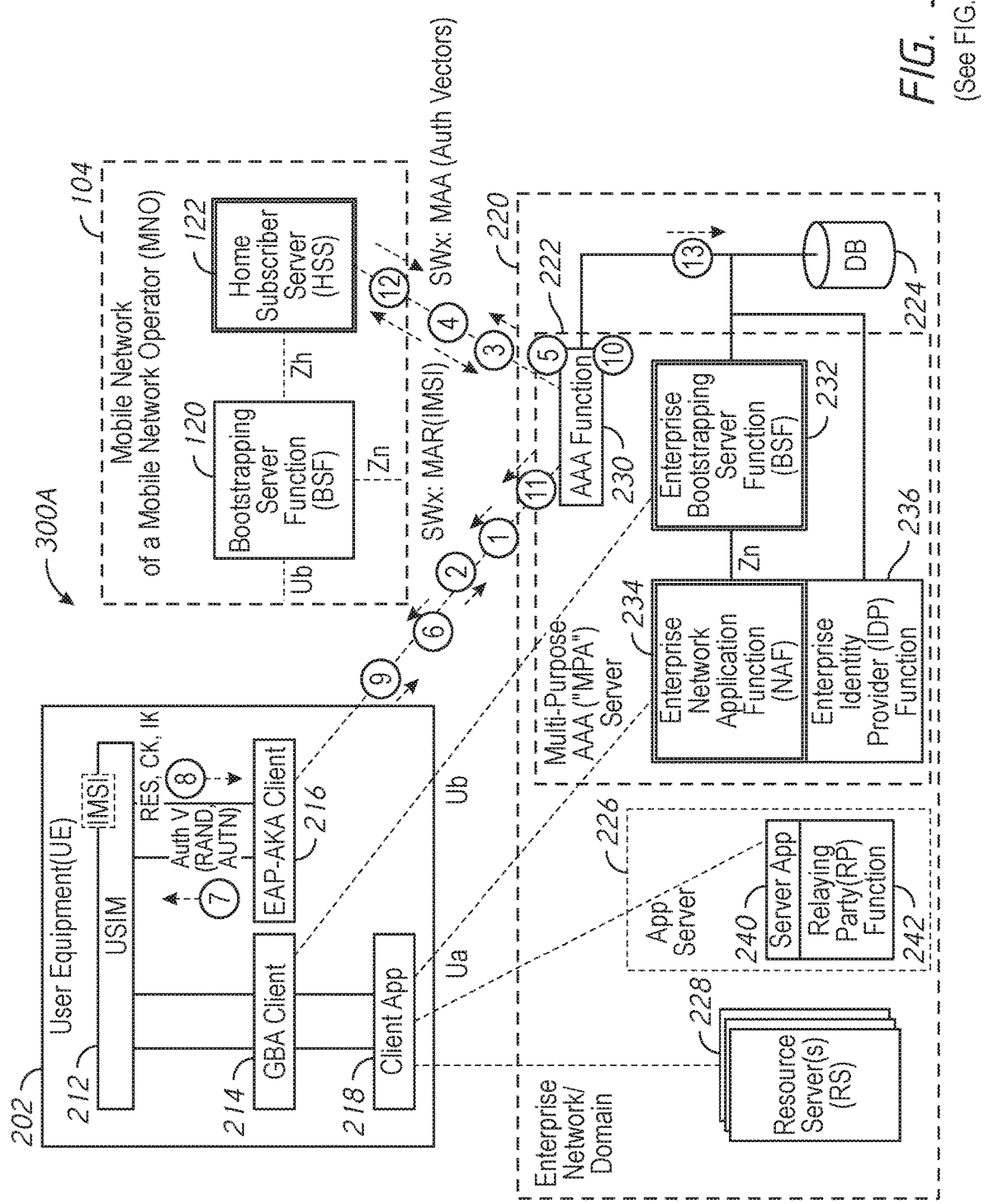
FIG. 3A is the network architecture of FIG. 2A indicating a first process flow for describing a technique for authenticating and securing communications for a UE using the MPA server of the enterprise network, more particularly indicating steps for performing authentication of the UE in a mobile network with use of an Extensible Authentication Protocol (EAP)-Authentication and Key Agreement (AKA) mechanism of the MPA server.
Figure 3B:
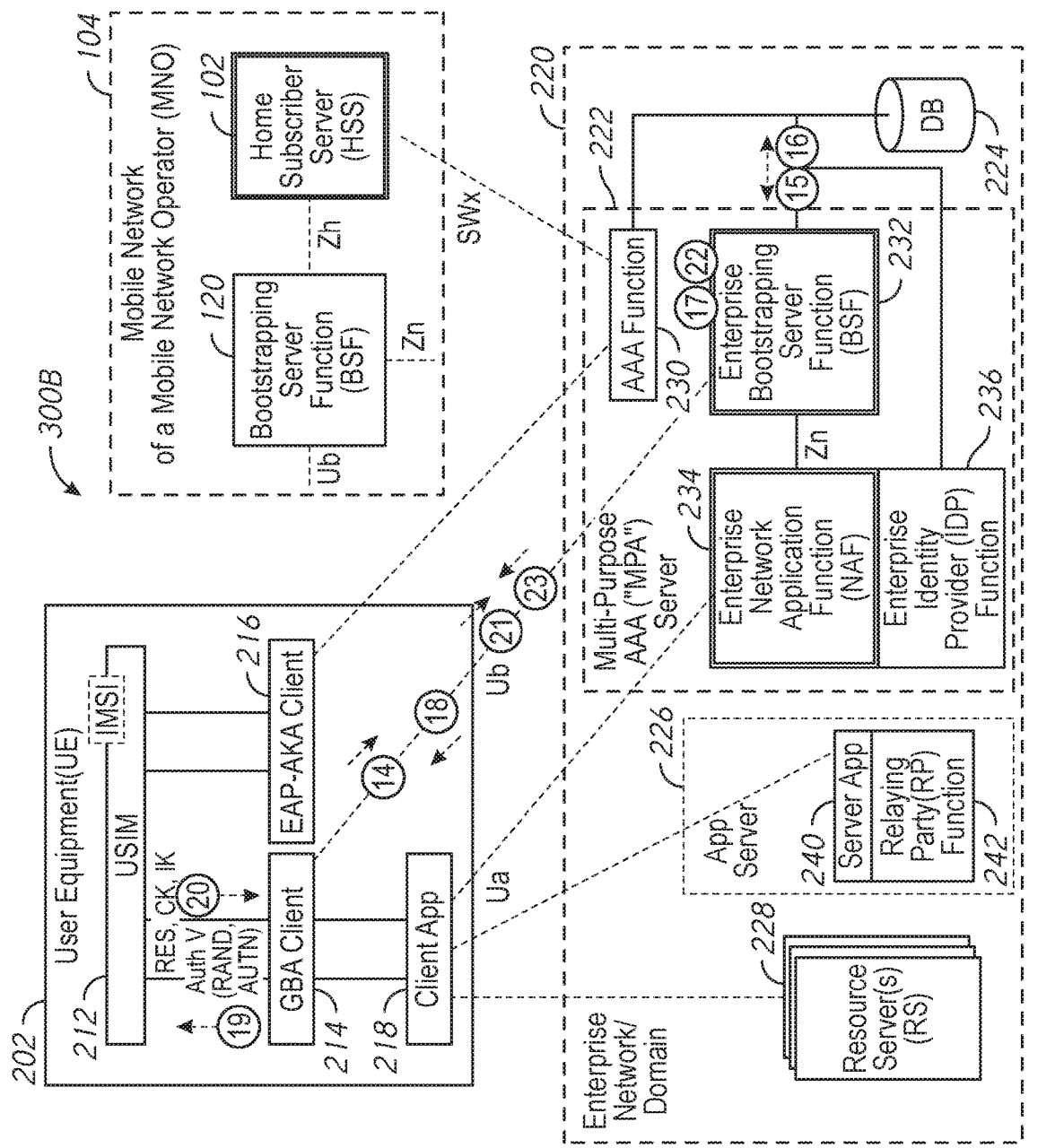
FIG. 3B is the network architecture of FIG. 2A indicating a second process flow for continuing the description of the technique for authenticating and securing communications for the UE using the MPA server of the enterprise network, more particularly indicating steps for performing a GBA bootstrapping procedure between the UE and an enterprise Bootstrapping Server Function (BSF) of the MPA server of the enterprise network.
Figure 3D:
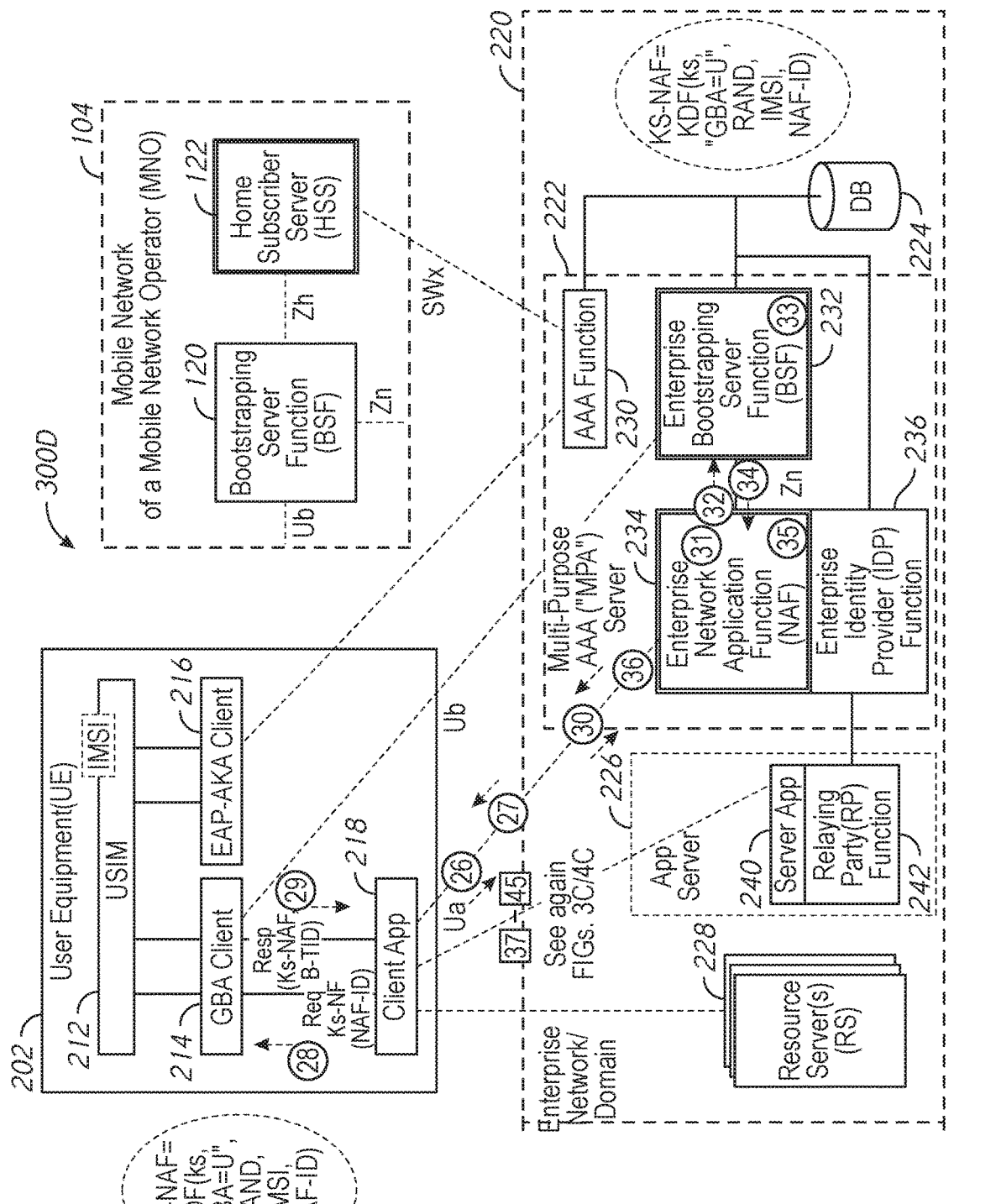
FIG. 3D is the network architecture of FIG. 2A indicating a fourth process flow for continuing the description of the technique for authenticating and securing communications for the UE using the MPA server of the enterprise network, more particularly indicating steps for performing a GBA bootstrapping usage procedure between the UE and an enterprise Network Application Function (NAF) of the MPA server of the enterprise network.
Figure 4B:
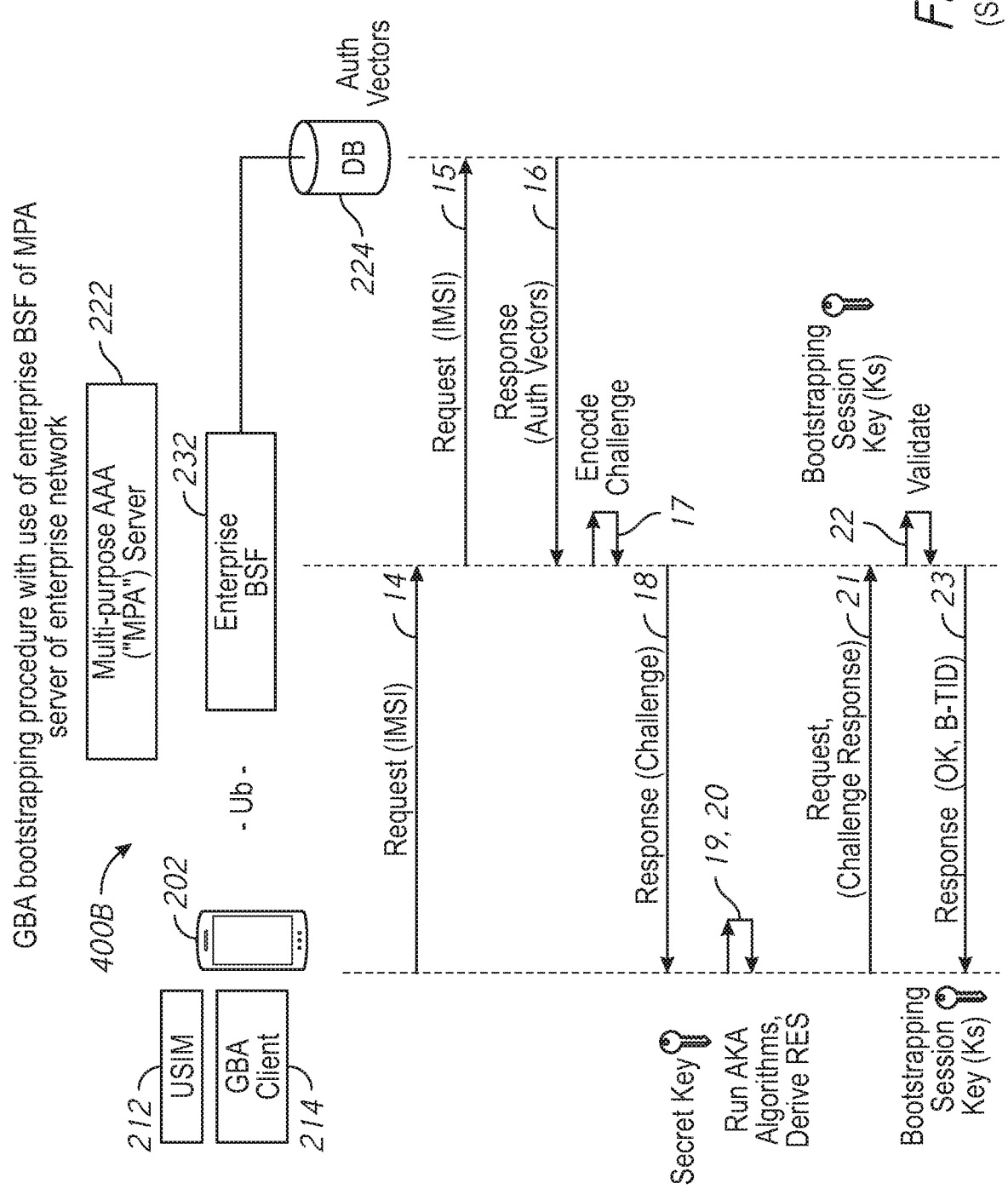
FIG. 4B is a second process flow diagram corresponding to the second process flow of FIG. 3B, particularly relating to the steps for performing the GBA bootstrapping procedure between the UE and the enterprise BSF of the MPA server of the enterprise network.
Figure 4C:
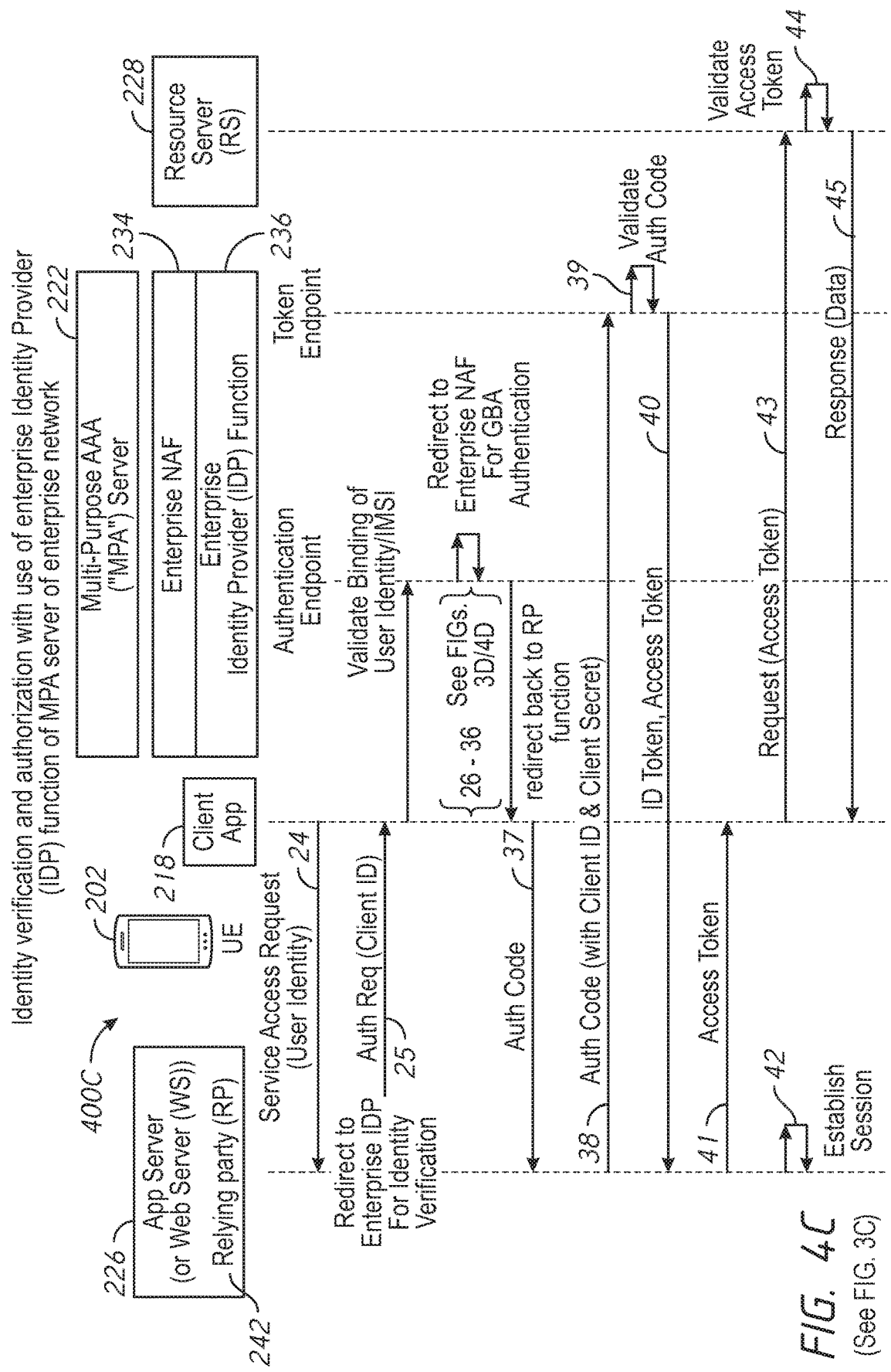
FIG. 4C is a third process flow diagram corresponding to the third process flow of FIG. 3C, particularly relating to the steps for performing the identity verification of the UE with use of the enterprise IDP function of the MPA server of the enterprise network.

More specifically, FIGS. 3A and 4A illustrate steps 1 to 13 for performing an authentication of the UE 292 in a mobile network with use of AAA function 230 (e.g., the EAP-AKA mechanism) of the MPA server 222; FIGS. 3B and 4B illustrate steps 14 to 23 for performing a GBA bootstrapping procedure between the UE 202 and enterprise BSF 232 of the MPA server 222; FIGS. 3C and 4C illustrate steps 24 to 45 (excluding steps 26 to 36 of FIGS. 3D and 4D) for performing an identity verification of the UE 202 with use of enterprise IDP function 236 of the MPA server 222; and FIGS. 3D and 4D illustrate steps 26 to 36 for performing a GBA bootstrapping usage procedure between the UE 202 and enterprise NAF 234 of the MPA server 222.

Description of the process flow will now begin by discussing FIGS. 3A and 4A in combination, illustrating steps 1 to 13 for performing an authentication of the UE 202 in the mobile network with use of AAA function 230 (e.g., the EAP-AKA mechanism) of the MPA server 222. In general, the technique in relation to FIGS. 3A and 4A may involve a procedure for authentication in the mobile network 104, via non-3GPP access (e.g. UE 202 may be provided wireless access via a WLAN of the enterprise network 220). The authentication may be an EAP-AKA authentication defined by one or more 3GPP standards specifications, such as 3GPP 29.273 and 3GPP 33.402. Note that UE 202 (or its EAP-AKA client 216) may communicate directly with AAA function 230 of MPA server 22 (or alternatively communicate with AAA function 230 via a server which may be an access server, a proxy server, or a network access server or NAS). Note further that HSS 122 may be more generally referred to as a subscription database (DB) of the mobile network.

To begin in FIGS. 3A and 4A, AAA function 230 may send an EAP-Request-Identity message to UE 202 (step 1 in FIGS. 3A and 4A). UE 202 may respond to the EAP-Request-Identity message with a mobile identity associated with UE 202 (step 2 of FIGS. 3A and 4A). The mobile identity in the message may be the IMSI from the USIM of UE 202.

After obtaining the mobile identity, AAA function 230 may request and receive from HSS 122 "AKA quintets" (or authentication vector) associated with the submitted IMSI (steps 3 and 4 of FIGS. 3A and 4A). The AKA quintets may include RAND (a random number generated by the HSS 122), XRES (an expected result part), CK (a session key for encryption), IK (a session key for integrity check), and AUTN (an authenticator part used for authenticating the network to the identity module or USIM).

Next, AAA function 230 may derive keying material based on the AKA quintet (step 5 of FIGS. 3A and 4A). Keying material may include a master key (MK) from which all other key material is derived. The master key may be derived as follows: MK=SHA1 (Identity|CK|IK), wherein the "|" character denotes concatenation and wherein SHA1 is a hash function as described in the Secure Hash Standard.

Next, AAA function 230 may initiate the AKA protocol by sending an EAP-Request/AKA-Challenge message to UE 202 (step 6 of FIGS. 3A and 4A). EAP-AKA packets may encapsulate parameters in attributes, encoded in a Type, Length, Value format. The EAP-Request/AKA-Challenge message may include a random number (AT_RAND), a network authentication token (AT_AUTN), and a message authentication code (AT_MAC).

In response, UE 202 may execute an AKA algorithm using its identity module (e.g., its USIM 212) and verify the AUTN (steps 7 and 8 of FIGS. 3A and 4A). If the verification is successful (e.g., communication is taking place with a legitimate network server), UE 202 may proceed to send the EAP-Response/AKA-Challenge to AAA function 230. This message may include a result parameter (AT_RES) that allows AAA function 230 to authenticate the UE 202, as well as the AT_MAC attribute to protect the integrity of the EAP message. AAA function 230 may verify that the AT_RES and the AT_MAC in the EAP-Response/AKA-Challenge packet are correct (step 10 of FIGS. 3A and 4A). AAA function 230 may send to UE 202 the EAP-Success packet, indicating that the authentication was successful (step 11 of FIGS. 3A and 4A). UE 202 is now authenticated in the mobile network 104.

During this procedure, one or more additional sets of authentication vectors may be retrieved from HSS 122 (step 12 of FIGS. 3A and 4A). These additional sets of authentication vectors may be stored in DB 224 of the enterprise network 200 for later use (step 13 of FIGS. 3A and 4A). In particular, these additional authentication vectors may be stored in DB 224 in association with the mobile identity (e.g. IMSI) of UE 202, for later use when retrieved in steps 15 and 16 of FIGS. 3B and 4B. The interface used between AAA function 230 and HSS 122 of the mobile network 104 may be the SWx interface defined by one or more 3GPP standards, such as 3GPP 29.273 (e.g., 3GPP EPS AAA interfaces). Here, AAA function 230 may send to HSS 122 a message which includes a multimedia authentication request (MAR) having the mobile identity (e.g. IMSI). In response, HSS 122 may retrieve the additional authentication vectors and send to AAA function 230 a message which includes a multimedia authentication answer (MAA) having the additional authentication vectors. The MAR/MAA may specify or indicate "[SIP-Number-Auth-Items]" as described in the standard specification.

Description of the process flow will now continue by discussing FIGS. 3B and 4B in combination, illustrating steps 14 to 23 for performing the GBA bootstrapping procedure between UE 202 and enterprise BSF 232 of the MPA server 222. Steps 14 to 23 of FIGS. 3B and 4B may follow steps 1 to 13 of FIGS. 3A and 4B. In this technique of FIGS. 3B and 4B, UE 202 may communicate with enterprise BSF 232 over the Ub interface; enterprise BSF 232 may retrieve a previously-stored authentication vector from DB 224 (e.g., rather than communicate with the HSS of the mobile network over the Zh interface).

To begin in FIGS. 3B and 4B, UE 202 (e.g., the GBA client 214 of UE 202) may send to enterprise BSF 232 a first request (step 14 of FIGS. 3B and 4B). The first request may be and/or be indicative of a request for initiating a bootstrapping procedure with enterprise BSF 232. A mobile identity (e.g. IMSI or IMPI) of UE 202 may be included in the first request. More specifically, the first request may be an HTTP GET or PUT request (e.g., GET Auth_Digest "IMSI").

The first request of step 14 may be received at enterprise BSF 232. In response, enterprise BSF 232 may send to DB 224 a request which includes the mobile identity (e.g. IMSI or IMPI) (step 15 of FIGS. 3B and 4B). DB 224 may receive the request from enterprise BSF 232, and return the previously-stored authentication vector associated with the received subscriber identity (step 16 of FIGS. 3B and 4B). The authentication vector may include a RAND and an AUTN.

The message in step 16 may be received by enterprise BSF 232. Enterprise BSF 232 may encode an authentication challenge for UE 202 (step 17 of FIGS. 3B and 4B). The authentication challenge may include the RAND and the AUTN. Enterprise BSF 232 may send to UE 202 a first response which includes the authentication challenge (step 18 of FIGS. 3B and 4B). More particularly, the first response may be or include an ACK 401 Unauthorized message (e.g. 401 Unauth_Digest), and may indicate a demand for authentication of UE 202.

UE 202 (e.g., its USIM 212) may perform various calculations associated with the challenge, and generate a challenge response based on the received information (steps 19 and 20 of FIGS. 3B and 4B). For example, USIM 212 may check the AUTN to verify that the challenge is from an authorized network; if the AUTN is successfully verified, then USIM 212 may calculate IK, CK, and RES parameters. UE 202 may then send to enterprise BSF 232 a second request (step 21 of FIGS. 3B and 4B). The second request may include a challenge response which includes the calculated RES (e.g., the Digest AKA response). In particularly, the second request may be an HTTP GET or PUT request (e.g., GET Auth_Digest "RES").

Enterprise BSF 232 may receive the second request which includes the challenge response communicated in step 21. Enterprise BSF 232 may validate the challenge response against an expected response (step 22 of FIGS. 3B and 4B). Here, enterprise BSF 232 may generate the bootstrapping session key (Ks) (concatenating CK and IK), and also produce a bootstrapping transaction identifier (B-TID) associated with the Ks. Enterprise BSF 232 may store the Ks in association with the B-TID. The B-TID may be stored in the MPA DB 224 in association with the mobile identity, application server identity, and/or user identity of UE 202 (see e.g. FIG. 2B).

Enterprise BSF 232 may send to UE 202 a second response (step 23 of FIGS. 3B and 4B). More particularly, the second response may be a 200 OK message indicating that validation was successful. The second response may include the B-TID and a key lifetime associated with the Ks. UE 202 may generate the bootstrapping session key (Ks) based on a concatenation of CK and IK (see e.g. previous steps 19 and 20), and store the Ks in association with the received B-TID. The B-TID, which is bound to the mobile identity (e.g. IMSI), is thus "bootstrapped" to the UE, and may be subsequently used as a temporary identifier for UE application layer authentication. UE 202 may use the Ks as a root key for the generation of application-specific session keys to secure the session over the Ua interface for GBA-enabled services in the enterprise network 220.

Description of the process flow will continue by discussing FIGS. 3C and 4C in combination, illustrating steps 24 to 45 (but excluding steps 26-36 which are described in relation to FIGS. 3D and 4D) for performing an identity verification of the UE 202 with use of IDP function 236 of the MPA server 222. Steps 24 to 45 of FIGS. 3C and 4C may follow steps 14 to 23 of FIGS. 3B and 4B. As a result of the technique of FIGS. 3C and 4C, UE 202 may be enabled to communicate with application server 226 and/or one or more resource servers (RS) 228 based on identity verification and authentication by enterprise IDP function 236.

Note again that, in the following example, enterprise IDP function 236 and RP function 242 may be configured for processing in accordance with OpenID Connect (e.g. in accordance with one or more OpenID Connect specifications, such as or including OpenID Connect Core). Again, enterprise IDP function 236 may be and/or be referred to as an enterprise OpenID Connect Provider (OP) function (e.g., an enterprise OP function). As described previously, OpenID Connect is a simple identity layer on top of an OAuth protocol (e.g. OAuth 2.0 protocol). It allows applications to verify the identity of the end user based on the authentication performed by an authorization server, as well as to obtain basic profile information about the end user in an interoperable and REST-like manner. What may be received as a result of such the procedure may include an identity (ID) token and/or an access token (e.g. see ahead steps 40 and 41). An identity token may be or include the user identity which is encoded in a secure JavaScript Object Notation (JSON) Web Token (JWT).

To begin in FIGS. 3C and 4C, UE 202 (or more particularly, client application 218 of UE 202) may send to application server 226 a message which includes a request for service access (step 24 of FIGS. 3C and 4C). The request may include a user identity associated with the application (e.g. see the user identities in DB 224 of FIG. 2B). In response, the request is redirected to enterprise IDP function 236 of MPA server 222 (step 25 of FIGS. 3C and 4C). The redirected request may indicate a request for an authorization code and include a client identifier (e.g. client ID) associated with the client application. Note that the client ID is the application server identity of application server 226/RP function 242 (see e.g. FIG. 2B).

The request received in step 25 may further include the user identity associated with the application. Here, the enterprise IDP function 236 may validate that the user identity is bound to or associated with the mobile identity of UE 202 as indicated in the MPA DB. Upon successful validation of the binding, the request at the enterprise IDP function 236 may be further redirected to enterprise NAF 234 of MPA server 222. This further redirection to enterprise NAF 234 is for performing authentication using a GBA bootstrapping usage procedure using the B-TID as a temporary identify for the UE (described later below in relation to steps 26 to 36 of FIGS. 3D and 4D). The result from a successful outcome of the GBA bootstrapping usage procedure may be an authorization code (e.g. a single-use authorization code) for use in the OpenID Connect procedure. For example, UE 202 may obtain the authorization code from enterprise NAF 234 as a result of the procedure.

Next in FIGS. 3C and 4C, UE 202 (or more particularly, client application 218 of UE 202) may send to RP function 242 of application server 226 a message which includes the authorization code (step 37 of FIGS. 3C and 4C). In turn, RP function 242 may send to enterprise IDP function 236 of MPA server 222 the authorization code for validation, along with the client ID and client secret (step 38 of FIGS. 3C and 4C). Enterprise IDP function 236 may receive the authorization code, client ID, and client secret communicated in step 38. In response, enterprise IDP function 236 may first consult the MPA DB to validate that the user identity provided to the application server 226 by the UE 202 is bound to the mobile identity (e.g. the IMSI) in the MPA DB. Further, the enterprise IDP function 236 may perform validation of the authorization code (step 39 of FIGS. 3C and 4C). In response to a successful validation of the authorization code, enterprise IDP function 236 may send to RP function 242 of application server 226 one or more messages which include an identity token (e.g. JWT) and an access token (e.g. (step 40 of FIGS. 3C and 4C).

RP function 242 of application server 226 may send to UE 202 (e.g., the client application 218) a message which includes the access token (step 41 of FIGS. 3C and 4C). The message of step 41 may be a response to the request for service access from previous step 24. Note that the access token may have a limited duration lifetime associated with it (e.g. a one-hour access token). As a result of the successful validation, application server 226 may establish a session with UE 202 with secure communication therebetween (step 42 of FIGS. 3C and 4C).

Even further, UE 202 may obtain access to one or more resource servers 228 with use of the access token. UE 202 (or associated client application 218) may send to resource server 228 a request for access which includes the access token (step 43 of FIGS. 3C and 4C). The resource server 228 may receive the request and validate the access token (step 44 of FIGS. 3C and 4C). Upon successful validation, the resource server 228 may send to UE 202 a message indicating the successful validation (step 45 of FIGS. 3C and 4C). One or more messages to UE 202 from resource server 228 may include application data (for a resource such as a directory or payroll database etc.).

Description of the process flow will continue by discussing FIGS. 3D and 4D in combination, illustrating steps 26 to 36 for performing a GBA bootstrapping usage procedure between the UE 202 and enterprise NAF 234 of the MPA server 222. Steps 26 to 36 of FIGS. 3D and 4D may follow steps 24-25 of FIGS. 3C and 4C. In this technique of FIGS. 3D and 4D, UE 202 may communicate with enterprise NAF 234 over the Ua interface, and enterprise NAF 234 communicate with enterprise BSF 232 over the Zn interface (e.g., rather than communicate with BSF 120 of the mobile network 104 over the Zn interface). For this process flow of FIGS. 3D and 4D, note that a bootstrapping session key (Ks) generated by the previously-performed GBA bootstrapping procedure may be used to secure communications with enterprise NAF 234 of the Ua interface.

To begin in FIGS. 3D and 4D, the first request may indicate a request for initiating a service (e.g. a web service or the like). The first request may be an HTTP GET or a PUT request. Enterprise NAF 234 may receive the first request communicated in step 26. In response, enterprise NAF 234 may send to UE 202 a first response (step 27 of FIGS. 3D and 4D). The first response may indicate a lack of authorization, and may be an ACK 401 Unauthorized message. The first response may include a NAF identifier (or NAF-ID) associated with enterprise NAF 234.

UE 202 may receive the first response communicated in step 27. In response, UE 202 (e.g. its GBA client 214) may derive NAF-specific shared key material (KsNAF) based on the Ks and the NAF-ID (steps 28 and 29 of FIGS. 3D and 4D). More specifically, the KsNAF may be generated as a function KDF (Ks, "GBA=U", RAND, IMSI, and NAF-ID). A B-TID associated with the KsNAF may also be generated. UE 202 may send to enterprise NAF 234 a second request (step 30 of FIGS. 3D and 4D). The second request may include information for authorization and, in particular, may be an HTTP GET or PUT request which includes the B-TID. More specifically in the second request, the B-TID may be submitted as a username and the KsNAF may be submitted as a password.

Enterprise NAF 234 may receive the second request which includes the authorization information communicated in step 30. Enterprise NAF 234 may proceed to validate the received authorization information with the assistance of enterprise BSF 232. To perform the validation, enterprise NAF 234 may send to enterprise BSF 232 a message indicating a request for the KsNAF (step 32 of FIGS. 3D and 4D). The request may include the B-TID and the NAF-ID. Enterprise BSF 232 may receive the message communicated in step 32. In response, enterprise BSF 232 may generate the KsNAF based on the received B-TID and NAF-ID (step 33 of FIGS. 3D and 4D). Enterprise BSF 232 may send to enterprise NAF 234 a message which includes a response having the generated KsNAF (step 34 of FIGS. 3D and 4D).

Enterprise NAF 234 may receive the message which includes the generated KsNAF communicated in step 34. Enterprise NAF 234 may then validate the KsNAF received from UE 202 with the KsNAF received from enterprise BSF 232 (step 35 of FIGS. 3D and 4D). A successful validation/authorization is based on identifying a match between the values, whereas an unsuccessful validation/authorization is based on failing to identify a match between the values. Enterprise NAF 234 may then send to UE 202 a second response indicating whether the authorization was successful (step 36 of FIGS. 3D and 4D). When authorization is successful, the second response may include the authorization code. The second response may be a 200 OK message. UE 202 may receive the second response including the authorization code communicated in step 36.

In some implementations of the above procedure of FIGS. 3A-3D and 4A-4D, the call flow of FIGS. 3A and 4A is performed first, followed by the call flow of FIGS. 3C and 4C where the call flow of FIGS. 3B and 4B is performed after step 27 of FIGS. 3C and 4C (e.g., steps 14-23 of FIGS. 3B and 4B are inserted in between steps 27 and 28 of FIGS. 3C and 4C).

Figure 5:
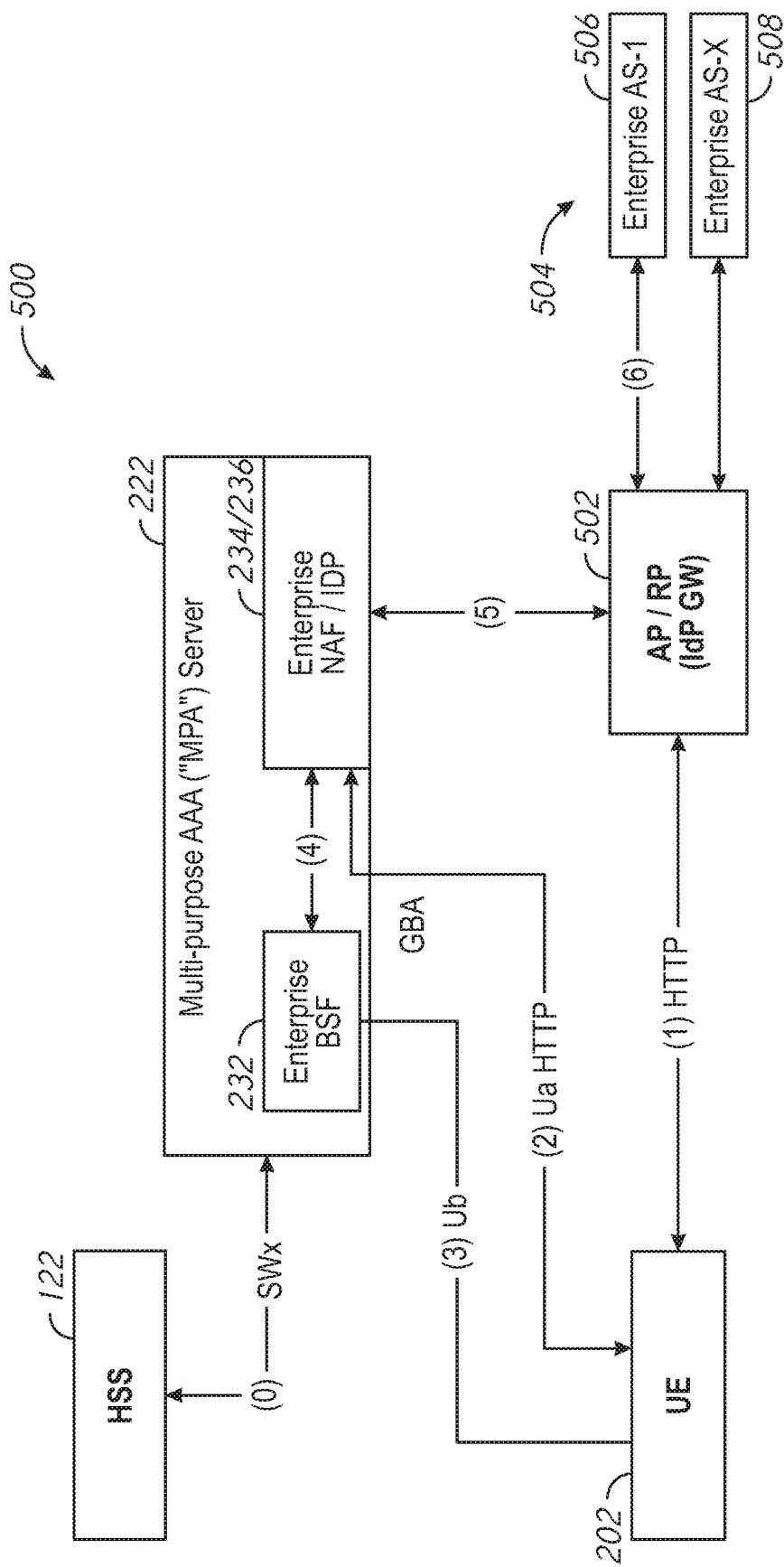
FIG. 5 is an illustrative representation of a variation on the network architecture and components shown in FIG. 2A.

FIG. 5 is an illustrative representation of a network architecture variation 500 on the network architecture and components shown in FIG. 2A. Recall that the network architecture of FIG. 2A includes one or more application servers having a relying party (RP) function. On the other hand, the network architecture variation 500 of FIG. 5 is arranged to accommodate (legacy) application servers that do not provide (e.g., are not upgraded with) an RP function.

In the network architecture variation 500 of FIG. 5, an IdP gateway (GW) 502 may be provided in the enterprise network between UE 202 and enterprise/application servers 504 (e.g. application server 506, and application server 508). Specifically, IdP GW 502 may be configured as an authentication proxy (AP)/Relying Party (RP), IdP GW (e.g., an AP/RP IdP GW). In general, IdP GW 502 may be configured to detect and/or intercept a communication or request between UE 202 and the application servers 504, serving as the RP function for one or more application servers 504. In general, the IdP GW 502 may authenticate users on behalf of the application servers 504.

The basic process flow as indicated in FIG. 5, which may generally be similar to or the same as the flow described in relation to the previous figures except where shown and described otherwise, may be as follows: (0) perform EAP-AKA authentication and retrieve authentication vectors using SWx interface; (1) UE 202 attempts to send to application server 506 a request for service access including its intended identity; the RP function of GW 502 detects and intercepts the request for redirection to enterprise IdP; (2) authentication for the enterprise IdP is needed where UE 202 begins to perform GBA bootstrapping usage procedure with enterprise NAF over the Ua interface; (3) UE 202 performs GBA bootstrapping procedure with enterprise BSF 232 over the Ub interface, where (4) enterprise BSF 232 communicates with enterprise NAF 234 over the Zn interface, and UE 202 completes the performance of the GBA bootstrapping procedure and obtains the Ks and B-TID associated therewith; (5) the RP function of GW 502 verifies the intended identity of UE 202 with the IDP function 236; and (6) UE 202 and application server 506 perform application communication.

Figure 6:
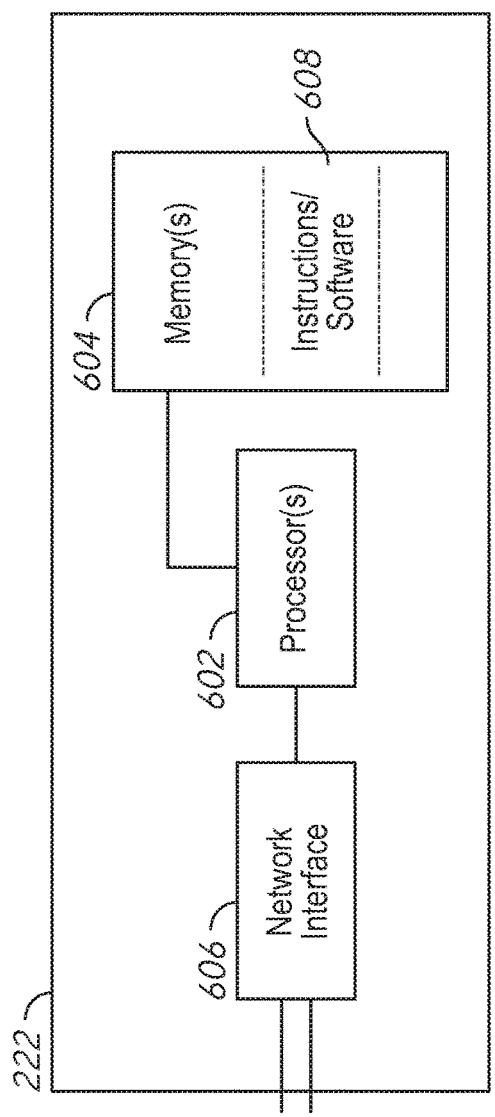
FIG. 6 is a block diagram of basic components of a server, network element, or equipment according to some implementations of the present disclosure.

FIG. 6 is a block diagram of basic components of a server (e.g. AAA server 222 of FIG. 2A), network element, or equipment according to some implementations of the present disclosure. The server of FIG. 6 has components which may include one or more processors 602 which are coupled to memory 604 and to a network interface 606. Network interface 606 may be configured to connect to a network for communications. The one or more processors 602 of the server are configured to operate according to instructions 608 stored in memory 604, in order to perform basic operations as well as to perform techniques of the present disclosure. Relatedly, a computer program product may include a non-transitory computer-readable medium (e.g. memory, a computer disk, etc.) and computer instructions stored in the non-transitory computer-readable medium that, when executed by one or more processors of the server, may perform the techniques of the present disclosure.

Figure 7:
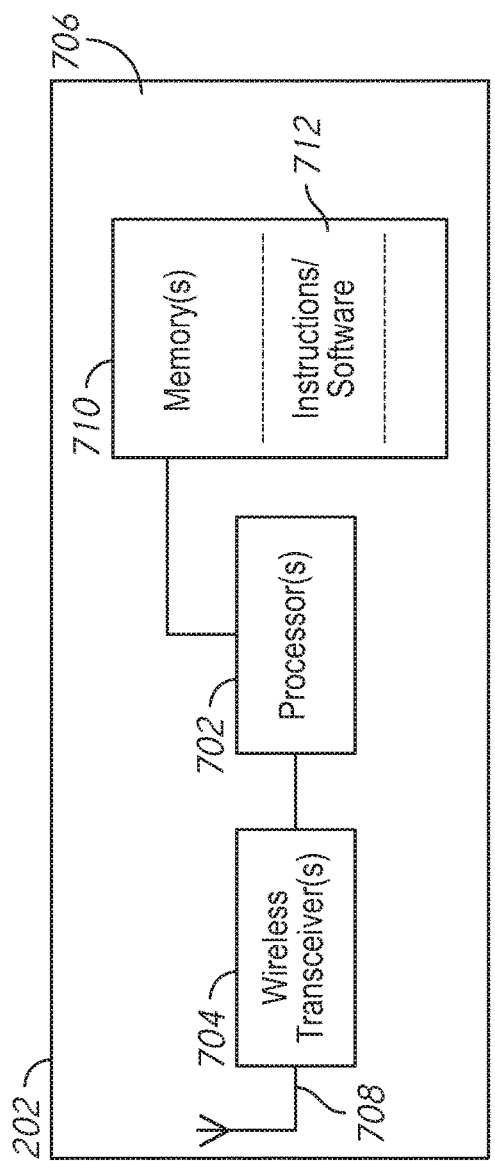
FIG. 7 is a block diagram of basic components of a UE according to some implementations of the present disclosure.

FIG. 7 is a block diagram of basic components of a UE (e.g. UE 202) according to some implementations of the present disclosure. The UE of FIG. 7 is shown to have components which include one or more processors 702 and a memory 710. The components may further include one or more wireless transceivers 704 coupled to one or more antennas 708 for communications. The components of the UE of FIG. 7 may be provided together as a single unit and, for example, contained in a (e.g. mechanical) housing 706. Memory 710 may store instructions/software 712 for operation. More particularly, the one or more processors 702 are configured to operate according to the instructions 712 in order to perform processes for basic operation of the UE, as well as to perform techniques of the present disclosure. Relatedly, a computer program product may include a non-transitory computer-readable medium (e.g. memory, a computer disk, etc.) and computer instructions stored in the non-transitory computer-readable medium that, when executed by one or more processors of the UE, may perform the described techniques of the present disclosure.

Thus, what has been described herein are single sign-on (SSO) techniques which provide for enterprise application user identities that are bound to a mobile identity (e.g. an IMSI or IMPI) of a user equipment (UE) for authentication, using GBA/GAA functionality in combination with identity provider (IDP) functionality (e.g. OpenID Connect), in an enterprise network environment. SSO techniques of the present disclosure need not rely (e.g. at all) on the MNO's GBA/GAA infrastructure in the mobile network. Put another way, the newly-provided GBA/GAA-based UE application layer authentication of the present disclosure may be transparent to the mobile network.

According to some implementations of the present disclosure, a method is performed at one or more enterprise authentication servers of an enterprise network which involves performing an authentication procedure with a UE associated with a mobile identity, for authenticating the UE in a mobile network based on an authentication vector retrieved from a subscription database of the mobile network based on the mobile identity; retrieving, from the subscription database of the mobile network, one or more additional authentication vectors based on the mobile identity and storing them in association with the mobile identity of the UE in a DB of the enterprise network; and performing, with use of an enterprise BSF of the enterprise network, a GBA bootstrapping procedure with the UE for authenticating the UE based on one of the additional authentication vectors retrieved from the DB of the enterprise network, and generating a bootstrapping session key (Ks) associated with a B-TID for use in subsequently authenticating the UE. The authentication procedure may comprise an EAP-AKA protocol, where the retrieving of the one or more additional authentication vectors may be performed over a SWx interface with the subscription database for non-3GPP access. The method may further involve performing, with use of an enterprise NAF, a GBA bootstrapping usage procedure with the UE for authenticating the UE with the enterprise BSF based on the B-TID for UE access to one or more application of an application server of the enterprise network. The GBA bootstrapping usage procedure may be further for receiving NAF-specific key material (KsNAF) based on the Ks and a NAF identifier of the enterprise NAF.

Further, an enterprise IDP function of the enterprise network may utilize the enterprise NAF for authentication. The enterprise IDP function may comprise an OpenID Connect Provider (OP) function. Here, the method may further involve sending, from the enterprise IDP function, an authorization code to the UE upon successful authentication with the enterprise NAF, where the authorization code is for use by the UE in obtaining, from an RP function utilized in the application server, an identity token and an access token associated with the UE. The method may further involve receiving, at the enterprise IDP function, the authorization code from the RP function utilized in the application server; validating, by the enterprise IDP function, the received authorization code; and sending, from the enterprise IDP function, at least one of an identity token and an access token to the RP function upon successful validation of the received authorization code. The method may further involve validating, by the enterprise IDP function, that the user identity is bound or associated with the mobile identity of the UE by consulting the DB.

In some other implementations in the present disclosure, an enterprise authentication server may comprise a mobile network authentication function configured to perform an authentication procedure with a UE associated with a mobile identity, for authenticating the UE in a mobile network based on an authentication vector retrieved from a subscription database of the mobile network based on the mobile identity, where one or more additional authentication vectors are retrieved from the subscription database based on the mobile identity and stored in association with the mobile identity of the UE in a DB of the enterprise network; and an enterprise BSF configured to perform a GBA bootstrapping procedure with the UE, for authenticating the UE based on one of the additional authentication vectors retrieved from the DB of the enterprise network, and generating a bootstrapping session key (Ks) associated with a B-TID for use in subsequently authenticating the UE. The enterprise authentication server may be further configured to maintain access to the DB which further stores the mobile identity of the UE in association with one or more user identities for use in UE access to one or more applications of an application server of the enterprise network. The enterprise authentication server may further comprise an enterprise NAF configured to perform a GBA bootstrapping usage procedure with the UE for authenticating the UE with the enterprise BSF based on the B-TID for UE access to one or more applications of an application server of the enterprise network. The enterprise authentication server may further comprise an enterprise identity provider (IDP) function which utilizes the enterprise NAF for authentication, where the enterprise IDP function is configured to send an authorization code to the UE upon successful authentication with the enterprise NAF; receive the authorization code from a RP function utilized in the application server; validate the received authorization code; and send at least one of an identity token and an access token to the RP function upon successful validation of the received authorization code.

In yet other implementations in the present disclosure, an enterprise authentication server for use in an enterprise network may comprise an authentication function for authenticating a UE in a mobile network via non-3GPP access, where the authentication function comprises an EAP-AKA protocol, configured to interface with a subscriber database of the mobile network over an SWx interface for retrieving an authentication vector for the authentication and one or more additional authentication vectors based on the mobile identity for storage in a DB of the enterprise network; and an enterprise BSF configured to perform a GBA bootstrapping procedure with the UE, for authenticating the UE based on one of the additional authentication vectors retrieved from the DB of the enterprise network, and generating a bootstrapping session key (Ks) associated with a B-TID for use in subsequently authenticating the UE. The enterprise authentication server may further comprise an enterprise NAF configured to perform a GBA bootstrapping usage procedure with the UE for authenticating the UE with the enterprise BSF based on the B-TID for UE access to one or more applications of an application server of the enterprise network. The DB may further store the mobile identity of the UE in association with one or more user identities for use in UE access to one or more applications of an application server of the enterprise network. Here, the enterprise authentication server may further comprise an enterprise IDP function which utilizes the enterprise NAF for authentication, where the enterprise IDP function may comprise an OpenID Connect Provider (OP) function and being configured to send an authorization code to the UE upon successful authentication with the enterprise NAF; receive the authorization code from an RP function utilized in the application server; validate the received authorization code; and send at least one of an identity token and an access token to the RP function upon successful validation of the received authorization code.

A UE operative in accordance with techniques of the present disclosure has also been described herein. In one illustrative example, the UE may include one or more processors and one or more wireless transceivers coupled to the one or more processors. The UE may be configured to perform, via an enterprise network, an EAP-AKA procedure for authentication in a mobile network based on an authentication vector obtained from the mobile network based on a mobile identity of the UE; perform a GBA bootstrapping procedure with the enterprise network for obtaining a Ks and a B-TID associated with the Ks, based on an additional authentication vector obtained from the mobile network based on the mobile identity; request access to an application of an application server of the enterprise network with a user identity; and perform a GBA bootstrapping usage procedure with the enterprise network for authentication based on the B-TID in order to access the application of the application server. The mobile identity may comprise an IMSI or IMPI, where the UE may be further operative with use of a USIM for use in the EAP-AKA procedure and the GBA bootstrapping procedure. A binding between the user identity and the mobile identity may be verified in the enterprise network for authentication to access the application of the application server. The UE may be further configured to receive from the enterprise network an authentication code as a result of the GPA bootstrapping usage procedure; provide to the enterprise network the authentication code to receive an access token; and request and receive access to a resource server of the enterprise network based on the authentication code.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

As an illustrative example, in some implementations of the present disclosure, the functions of MPA server 222 indicated in FIG. 2A may be provided on more than one physical server of the enterprise network 220. As another example, the architecture and functionality in the enterprise network 200 may operate in association with a 4G/LTE mobile network having an HSS or alternatively a 5G mobile network (e.g. per 3GPP 23.501 standard specification) where the subscription database is a unified data management (UDM) entity and/or Unified Data Repository (UDR). As a further example, the architecture and functionality in the enterprise network may use any suitable protocol for identity verification, authorization, and/or authentication, different from the OpenID Connect protocol, such as a Security Assertion Markup Language (SAML) protocol.

It will also be understood that, although the terms "first," "second," etc. may be used herein to describe various elements, these elements should not be limited by these terms. These terms are only used to distinguish one element from another. For example, a first user identity could be termed a second user identity, and similarly, a second user identity could be termed a first user identity, without changing the meaning of the description, so long as all occurrences of the "first user identity are renamed consistently and all occurrences of the second "user identity" are renamed consistently. The first user identity and the second user identity are both user identities, but they are not the same user identity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at one or more enterprise authentication servers of an enterprise network,
   performing an authentication procedure with a user equipment (UE) associated with a mobile identity, for authenticating the UE in a mobile network based on an authentication vector retrieved from a subscription database of the mobile network based on the mobile identity;
   retrieving, from the subscription database of the mobile network, one or more additional authentication vectors based on the mobile identity and storing the one or more additional authentication vectors in association with the mobile identity of the UE in a database (DB) of the enterprise network; and
   performing, with use of an enterprise bootstrapping server function (BSF) of the enterprise network, a general bootstrapping architecture (GBA) bootstrapping procedure with the UE for authenticating the UE based on one of the additional authentication vectors retrieved from the DB of the enterprise network, and generating a bootstrapping session key (Ks) associated with a bootstrapping transaction identifier (B-TID) for use in subsequently authenticating the UE for access to an application of an application server.

2. The method of claim 1, wherein the one or more enterprise authentication servers maintain access to the DB which further stores the mobile identity of the UE in association with one or more user identities for use in UE access to one or more applications of the application server of the enterprise network.

3. The method of claim 2, further comprising,
performing, with use of an enterprise network application function (NAF), a GBA bootstrapping usage procedure with the UE for authenticating the UE with the enterprise BSF based on the B-TID for UE access to the one or more applications of the application server.

4. The method of claim 3, wherein the GBA bootstrapping usage procedure is further for receiving NAF-specific key material (KsNAF) based on the Ks and a NAF identifier of the enterprise NAF.

5. The method of claim 3, wherein an enterprise identity provider (IDP) function utilizes the enterprise NAF for authentication, the method further comprising:
sending, from the enterprise IDP function, an authorization code to the UE upon successful authentication with the enterprise NAF, the authorization code being for use by the UE in obtaining, from a relying party (RP) function utilized in the application server, an identity token and an access token associated with the UE.

6. The method of claim 5, further comprising:
receiving, at the enterprise IDP function, the authorization code from the RP function utilized in the application server;
validating, by the enterprise IDP function, the received authorization code; and
sending, from the enterprise IDP function, at least one of an identity token and an access token to the RP function upon successful validation of the received authorization code.

7. The method of claim 5, further comprising:
validating, by the enterprise IDP function, that the one or more user identities are bound or associated with the mobile identity of the UE by consulting the DB.

8. The method of claim 5, wherein the enterprise IDP function comprises an OpenID Connect Provider (OP) function.

9. The method of claim 1, wherein the authentication procedure comprises an extensible authentication protocol (EAP)-authentication and key agreement (AKA) protocol.

10. The method of claim 1, wherein the retrieving of the one or more additional authentication vectors is performed over a SWx interface with the subscription database for non-3GPP access.

11. The method of claim 1, further comprising:
wherein the subscription database comprises a home subscription server (HSS) or a unified data management (UDM) entity;
wherein the mobile identity comprises an International Mobile Subscriber Identity (IMSI); and
wherein the authentication vector comprises a random number (RAND) and an authenticator part (AUTN).

12. The method of claim 1, which is performed without interaction with a BSF of the mobile network.

13. An enterprise authentication server comprising:
one or more hardware processor;
the one or more hardware processors being operative to:

perform, via a mobile network authentication function, an authentication procedure with a user equipment (UE) associated with a mobile identity, for authenticating the UE in a mobile network based on an authentication vector retrieved from a subscription database of the mobile network based on the mobile identity, wherein one or more additional authentication vectors are retrieved from the subscription database based on the mobile identity and stored in association with the mobile identity of the UE in a database (DB) of an enterprise network; and perform, via an enterprise bootstrapping server function (BSF), a general bootstrapping architecture (GBA) bootstrapping procedure with the UE; for authenticating the UE based on one of the additional authentication vectors retrieved from the DB of the enterprise network, and generating a bootstrapping session key (Ks) associated with a bootstrapping transaction identifier (B-TID) for use in subsequently authenticating the UE for access to an application of an application server.

14. The enterprise authentication server of claim 13, the one or more hardware processors further being operative to:
maintain access to the DB which further stores the mobile identity of the UE in association with one or more user identities for use in UE access to one or more applications of the application server of the enterprise network.

15. The enterprise authentication server of claim 14, the one or more hardware processors further being operative to:
perform, via an enterprise network application function (NAF), a GBA bootstrapping usage procedure with the UE for authenticating the UE with the enterprise BSF based on the B-TID for UE access to the one or more applications.

16. The enterprise authentication server of claim 15, further comprising:
an enterprise identity provider (IDP) function which utilizes the enterprise NAF for authentication, the one or more hardware processors further being operative to:
send, via the enterprise IDP function, an authorization code to the UE upon successful authentication with the enterprise NAF;
receive, via the enterprise IDP function, the authorization code from a relying party (RP) function utilized in the application server;
validate, via the enterprise IDP function, the received authorization code; and
send, via the enterprise IDP function, at least one of an identity token and an access token to the RP function upon successful validation of the received authorization code.

17. A user equipment (UE) comprising:
one or more processors;
one or more wireless transceivers coupled to the one or more processors;
the one or more processors being operative to:
perform, via an enterprise network, an Extensible Authentication Protocol (EAP)-Authentication and Key Agreement (AKA) procedure for authentication in a mobile network based on an authentication vector obtained from the mobile network based on a mobile identity of the UE;
perform a General Bootstrapping Procedure (GBA) bootstrapping procedure with the enterprise network for obtaining a bootstrapping session key (Ks) and a bootstrapping transaction identifier (B-TID) associated with the Ks, based on an additional authentication vector obtained from the mobile network based on the mobile identity;

request access to an application of an application server of the enterprise network with a user identity; and perform a GBA bootstrapping usage procedure with the enterprise network for authentication based on the B-TID in order to access the application of the application server.

18. The UE of claim 17, wherein a binding between of the user identity and the mobile identity is verified in the enterprise network for authentication to access the application of the application server.

19. The UE of claim 17, wherein the one or more processors are further operative to:

receive from the enterprise network an authentication code as a result of the GBA bootstrapping usage procedure; and provide to the enterprise network the authentication code to receive an access token; and request and receive access to a resource server of the enterprise network based on the authentication code.

20. The UE of claim 17, further comprising:

wherein the mobile identity comprises an International Mobile Subscriber Identity (IMSI); and wherein the UE is operative with a Universal Subscriber Identity Module (USIM) for use in the EAP-AKA procedure and the GBA bootstrapping procedure.

* * * * *